United States Patent
Beatty et al.

(10) Patent No.: US 6,972,161 B2
(45) Date of Patent: Dec. 6, 2005

(54) FUEL CELL ASSEMBLY AND METHOD OF MAKING THE SAME

(75) Inventors: Christopher Beatty, Albany, OR (US); David Champion, Lebanon, OR (US); Gregory S Herman, Albany, OR (US); Peter Mardilovich, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 446 days.

(21) Appl. No.: 10/269,791

(22) Filed: Oct. 10, 2002

(65) Prior Publication Data

US 2004/0072057 A1   Apr. 15, 2004

(51) Int. Cl.⁷ ............................ H01M 2/14; H01M 8/10
(52) U.S. Cl. .......................................... 429/38; 429/32
(58) Field of Search ............................... 429/38, 30, 32

(56) References Cited

U.S. PATENT DOCUMENTS

| | | | |
|---|---|---|---|
| 5,998,058 A | 12/1999 | Fredley | 429/44 |
| 6,007,683 A | 12/1999 | Jankowski et al. | 204/192.17 |
| 6,024,848 A | 2/2000 | Dufner et al. | 204/252 |
| 6,048,636 A | 4/2000 | Naoumidis et al. | 429/44 |
| 6,794,075 B2 * | 9/2004 | Steele et al. | 429/30 |
| 2002/0076589 A1 | 6/2002 | Bostaph et al. | |

FOREIGN PATENT DOCUMENTS

| | | | |
|---|---|---|---|
| EP | 1 261 059 | * | 11/2002 |
| GB | 2 400 723 | * | 10/2004 |
| WO | WO0045457 | | 8/2000 |
| WO | WO0209218 | | 1/2002 |

* cited by examiner

Primary Examiner—Patrick Joseph Ryan
Assistant Examiner—Thomas H. Parsons

(57) ABSTRACT

A fuel cell assembly in accordance with a present invention includes a substrate including a reactant-permeable region and a non-permeable support region and a fuel cell carried by the substrate.

33 Claims, 19 Drawing Sheets

FUEL CELL ASSEMBLY AND METHOD OF MAKING THE SAME

BACKGROUND OF THE INVENTIONS

1. Field of the Inventions

The present inventions are related to fuel cells and methods of making fuel cells.

2. Description of the Related Art

Fuel cells, which convert reactants (i.e. fuel and oxidant) into electricity and reaction products, are advantageous because they are not hampered by lengthy recharging cycles, as are rechargeable batteries, and are relatively small, lightweight and produce virtually no environmental emissions. Nevertheless, the inventors herein have determined that conventional fuel cells are susceptible to improvement. For example, the inventors herein have determined that it would be desirable to form fuel cells on substrates that not only allow a reactant to flow therethrough, but are also mechanically robust, can be formed with relatively inexpensive materials and processes, and can be formed using processes that lend themselves to precise control.

BRIEF DESCRIPTION OF THE DRAWINGS

Detailed description of preferred embodiments of the inventions will be made with reference to the accompanying drawings.

FIG. 4b is a section view taken along line 4b—4b in FIG. 4a.

DETAILED DESCRIPTION OF THE PREFERRED EMBODIMENTS

The following is a detailed description of the best presently known modes of carrying out the inventions. This description is not to be taken in a limiting sense, but is made merely for the purpose of illustrating the general principles of the inventions. It is noted that detailed discussions of fuel cell structures that are not pertinent to the present inventions have been omitted for the sake of simplicity. The present inventions are also applicable to a wide range of fuel cell technologies and fuel cell systems, including those presently being developed or yet to be developed. For example, although various exemplary fuel cell system are described below with reference to solid oxide fuel cells ("SOFCs"), other types of fuel cells, such as proton exchange membrane ("PEM") fuel cells, are equally applicable to the present inventions.

Figure 1:
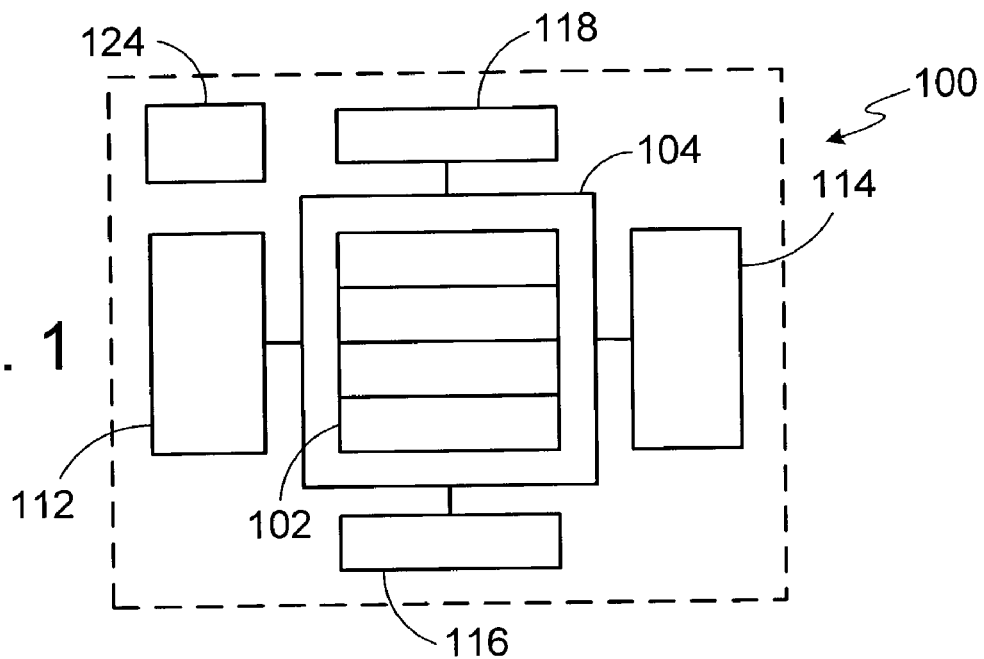
FIG. 1 is a diagrammatic view of a fuel cell system in accordance with a preferred embodiment of a present invention.
Figure 2:
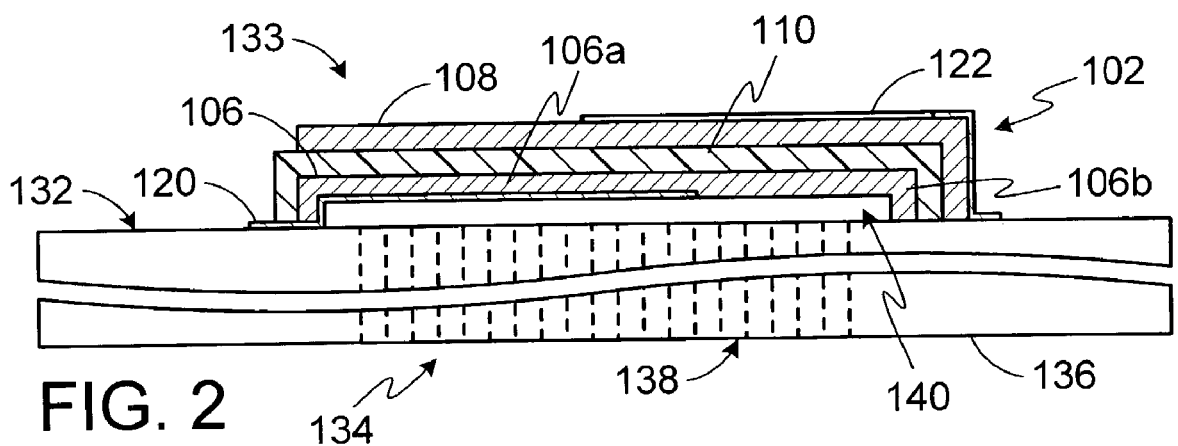
FIG. 2 is a side, partial section view of a fuel cell assembly in accordance with a preferred embodiment of a present invention.
Figure 3:
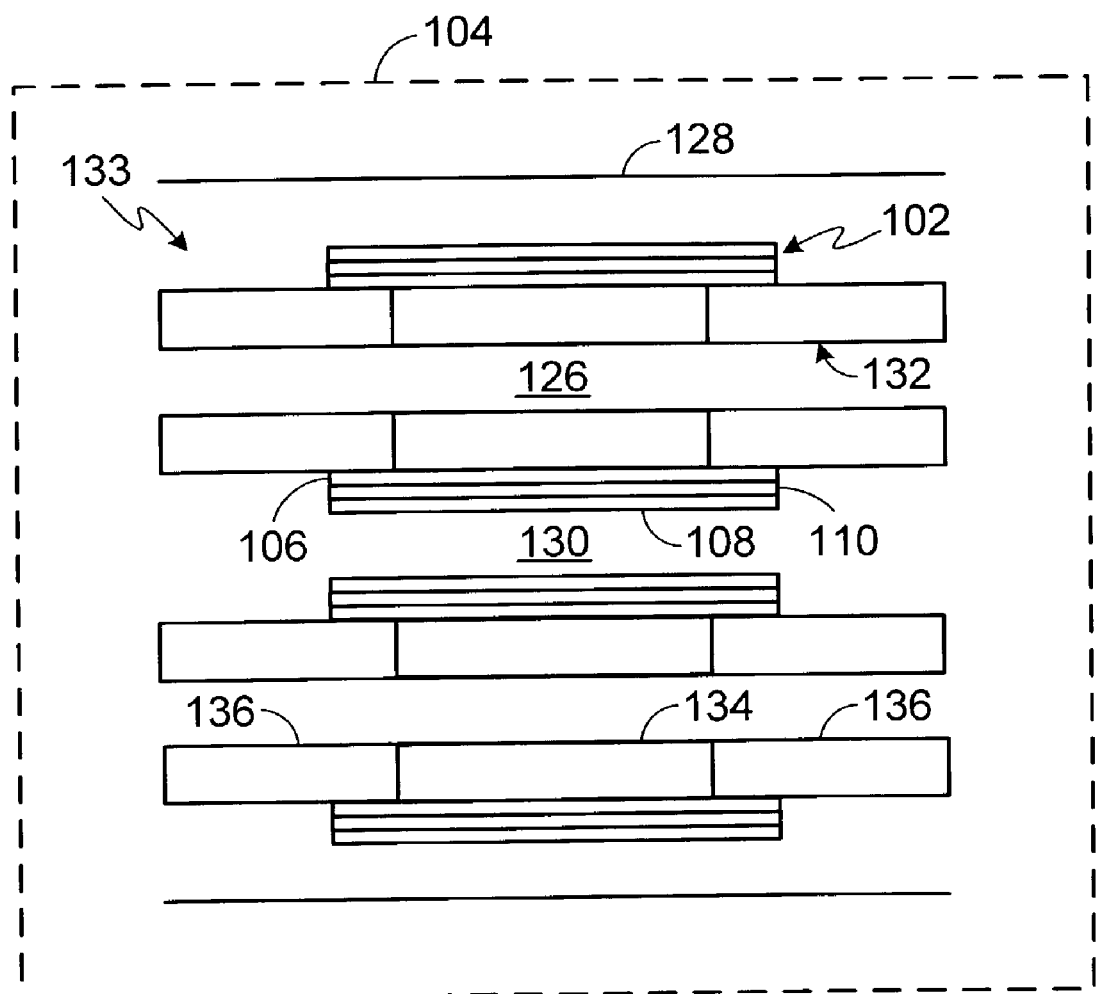
FIG. 3 is a diagrammatic view of a fuel cell stack arrangement in accordance with a preferred embodiment of a present invention.

As illustrated for example in FIGS. 1–3, a fuel cell system 100 in accordance with one embodiment of the present invention includes a plurality of solid oxide fuel cells 102 packaged in a stack 104. Each fuel cell 102 includes an anode 106 and a cathode 108 separated by an electrolyte 110. A fuel supply 112 supplies fuel, such as $H_2$ or hydrocarbon fuels such as $CH_4$, $C_2H_6$, $C_3H_8$, etc. to the anode 106 of each cell 102 by way of an inlet manifold (not shown) and an oxidant supply 114 supplies oxidant, such as $O_2$ or ambient air, to the cathode 108 of each cell by way of an inlet manifold (not shown). In those instances where ambient air is used, the oxidant supply may simply be a vent or a vent and fan arrangement. The oxidant is electrochemically ionized at the cathodes 108, thereby producing ions that diffuse through the conducting electrolytes 110 and react with the fuel at the anodes 106 to produce by-products ($CO_2$ and water vapor in the exemplary embodiment). The byproducts are vented out of the stack by way of outlet manifolds (not shown) and byproduct outlets 116 and 118. Current collectors 120 and 122 are respectively connected to the anodes 106 and cathodes 108. A controller 124 may be provided to monitor and control the operations of the exemplary fuel cell system 100. Alternatively, the operation of the fuel cell system may be controlled by the host (i.e. power consuming) device.

The individual fuel cells 102 in the exemplary system 100 are stacked such that the anodes 106 of adjacent cells face one another with fuel passages 126 therebetween, while the adjacent cathodes 108 face one another (or face a wall 128 at the ends of the stack) with oxidant passages 130 therebetween. Adjacent anodes 106 may be connected to one another in parallel, and their respective cathodes 108 may also be connected in parallel, and the parallel pairs of anodes are connected in series to the next parallel pairs of cathodes. The preferred connection scheme depends on the power requirements of the load. The fuel and oxidant passages 126 and 130 in the exemplary embodiments may be a simple volume (as shown) or a single tortuous path. Alternatively, one or more of the fuel passages and/or one or more of the oxidant passages may be in the form of a multiple channel passage that is either simple or tortuous. It should also be noted that the exemplary stack 104 may be arranged in the traditional bipolar configuration instead of the illustrated unipolar configuration.

The exemplary fuel cells 102 illustrated in FIGS. 1–3 are carried on substrates 132, which act as support structures for the fuel cells during and after the fuel cell manufacturing process. The combination of a fuel cell 102 and a supporting substrate 132 defines a fuel cell assembly 133. The exemplary substrates 132 include a reactant permeable region 134 and a non-permeable support region 136. The reactant permeable region 134 preferably consists of a plurality of apertures 138 through which the reactant may pass. The anode 106 is adjacent to the substrate 132 in the exemplary implementation illustrated in FIGS. 1–3 and, accordingly, fuel will pass through the reactant permeable region 136. Alternatively, as discussed below with reference to FIG. 5, the cathode 108 may be adjacent to the substrate 132 and oxidant will pass through the reactant permeable region 136.

There is also an open region (or "reactant gap") 140 between the electrode (i.e. the anode 106 or the cathode 108) and the substrate 132 in the exemplary fuel cell illustrated in FIG. 2. The reactant gap 140, which facilitates efficient mass flow across the associated electrode and removal of depleted reactants, is defined by the main wall 106*a* and side walls 106*b* of the anode 106 and the top surface (as oriented in FIG. 2) of the substrate 132. A similar configuration would be present in those instances where the electrode adjacent to the substrate 132 was the cathode.

There are a number of advantages associated with the present fuel cell assembly 133. For example, the present fuel cell assembly 133 may be manufactured by single-sided manufacturing processes. Additionally, as compared to a substrate that is entirely porous, the non-permeable support region 136 provides strength and structural rigidity at the edges of the fuel cell 102 where interconnects can be bonded by welding, brazing, adhesive or other suitable techniques. The non-permeable support region 136 also provides a mechanically robust structure for the manifolds, reactant flow paths, and other fuel cell packaging functions. The manifolds and reactant flow paths may be formed in non-permeable support region 136 or, alternatively, the manifolds and reactant flow paths may be formed in a separate structure that is secured to the outer perimeter of the non-permeable support region. The reactant permeable region 134 facilitates the removal of the sacrificial material (discussed below) that is used during the formation of the reactant gap 140. The substrate 132 also acts as an insulator and, because the fuel cell 102 is carried on the substrate, the total volume and mass of material that must be kept at the operating temperature (e.g. 500–1000° C. in a SOFC) is reduced as compared to an electrode supported design where the porous electrode must be thicker to be mechanically stable.

Although the materials, dimensions, and configuration of the exemplary fuel cell 102 and substrate 132 will depend upon the type of fuel cell (e.g. SOFC, PEM, etc.) and intended application, and although the present inventions are not limited to any particular materials, dimensions, configuration or type, an exemplary fuel cell assembly including a SOFC is described below. The fuel cell 102 is preferably a "thin" fuel cell (i.e. a fuel cell that is between about 30–800 $\mu$m thick) because fuel cells with relatively thick electrodes are typically self-supporting. The anode 106 in the exemplary fuel cell 102 is preferably a porous, ceramic and metal composite (also referred to as "cermet") film that is about 1–100 $\mu$m thick. Suitable ceramics include samaria-doped ceria ("SDC"), gandolinia-doped ceria (GDC) and yttria stabilized zirconia ("YSZ") and suitable metals include nickel and copper. The exemplary cathode 108 is preferably a porous ceramic film that is about 1–100 μm thick. Suitable ceramic materials include samarium strontium cobalt oxide ("SSCO"), lanthanum strontium manganate, bismuth copper substituted vanadate. The electrolyte is preferably a non-porous ceramic film, such as SDC, GDC or YSZ, that is about 1–100 μm thick. The reactant gap 140 is about 1–100 μm thick in the exemplary embodiment. It should be noted that in those implementations where the reactant gap 140 is employed, the electrodes and electrolyte must define a self-supporting structure or be otherwise supported by intermediate structures.

Turning to the exemplary substrate 132, it is preferably formed from strong, inert material such as a ceramic material (e.g. alumina, stabilized zirconia, magnesia, forsterite and Macor®), a metallic material (e.g. stainless steel or Inconel®)), a polymeric material (e.g. polysulfone or polycarbonate) or a combination thereof. Polymeric substrates are especially useful in fuel cells, such as PEM fuel cells, that operate at relatively low temperatures. Additionally, the substrate material that is selected for a particular fuel cell should have a coefficient of expansion that matches the anode, cathode, electrolyte, interconnects and packaging. The substrate 132 will typically be about 5–100 times as thick as fuel cell 102. In those instances where a portion of the fuel cell passes through the substrate (see, e.g., FIG. 7), the substrate will typically be about 5–100 times as thick as the portions of the fuel cell that are carried on the top or bottom surface of the substrate. In the exemplary implementation, the substrate 132 is about 500 μm thick and is preferably a unitary (i.e. one-piece) structure. The majority of the overall surface area of the substrate 132 will preferably be occupied by the reactant permeable region 134. [Note FIG. 4*a*.] Within the reactant permeable region 134, the cross-sectional area of the apertures 138 should be maximized. Although the present inventions are not limited to any particular cross-sectional shape, the exemplary apertures 138 are circular, are about 100–1000 μm in diameter and are spaced apart by about 100–1000 μm in the X-direction and Y-direction, as compared to the pores in a porous structure, which are about 0.1–10 μm in diameter. [It should be noted here that, given the order of magnitude differences in the thicknesses of the components, the drawings in the present application are not drawn to scale.] Other cross-sectional shapes such as, for example, triangles, rectangles, squares and hexagons, may also be employed.

Figure 4A:
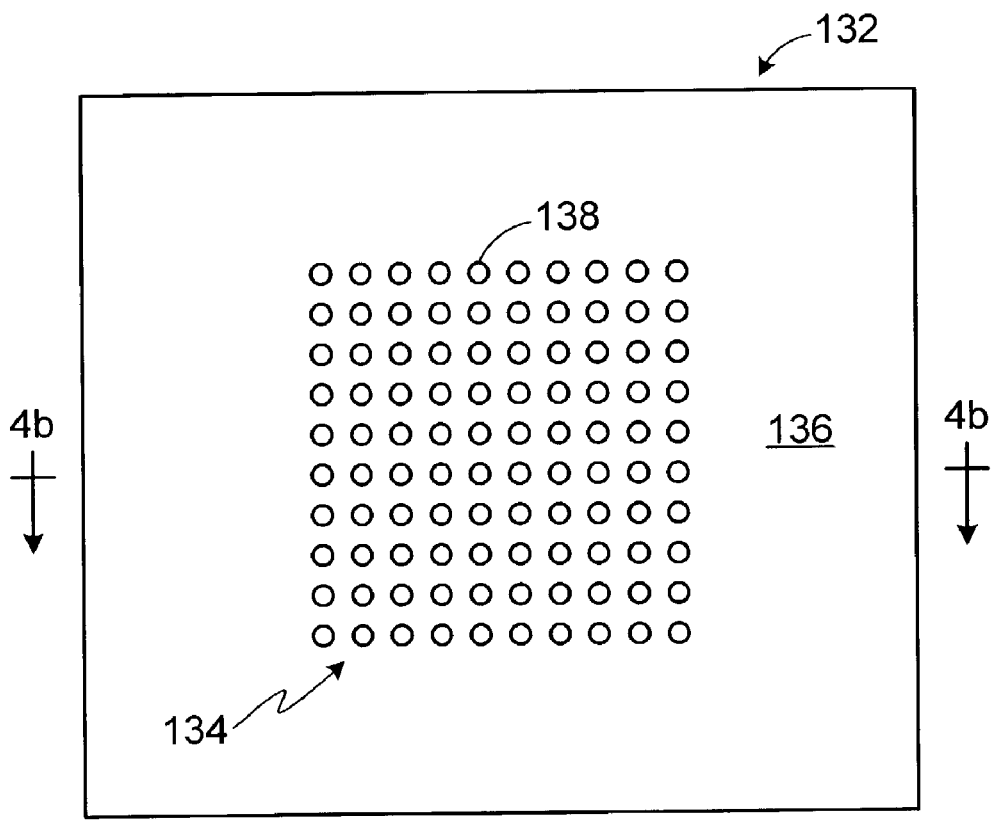
FIG. 4a is plan view illustrating a step in a fuel cell assembly manufacturing process in accordance with a preferred embodiment of a present invention.
Figure 4B:
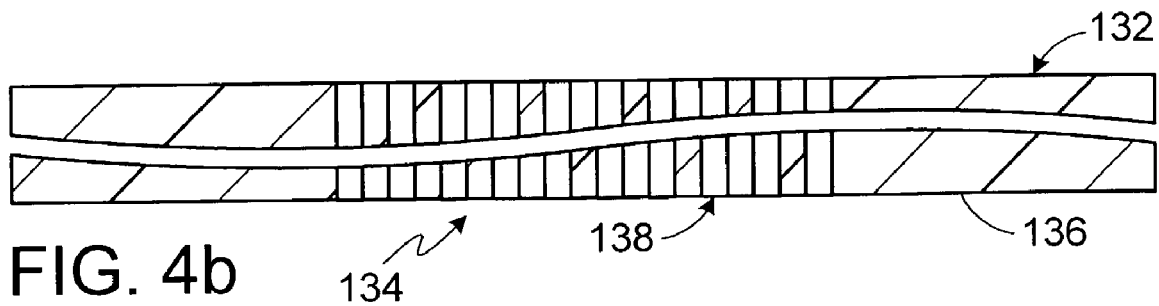
Figure 4C:
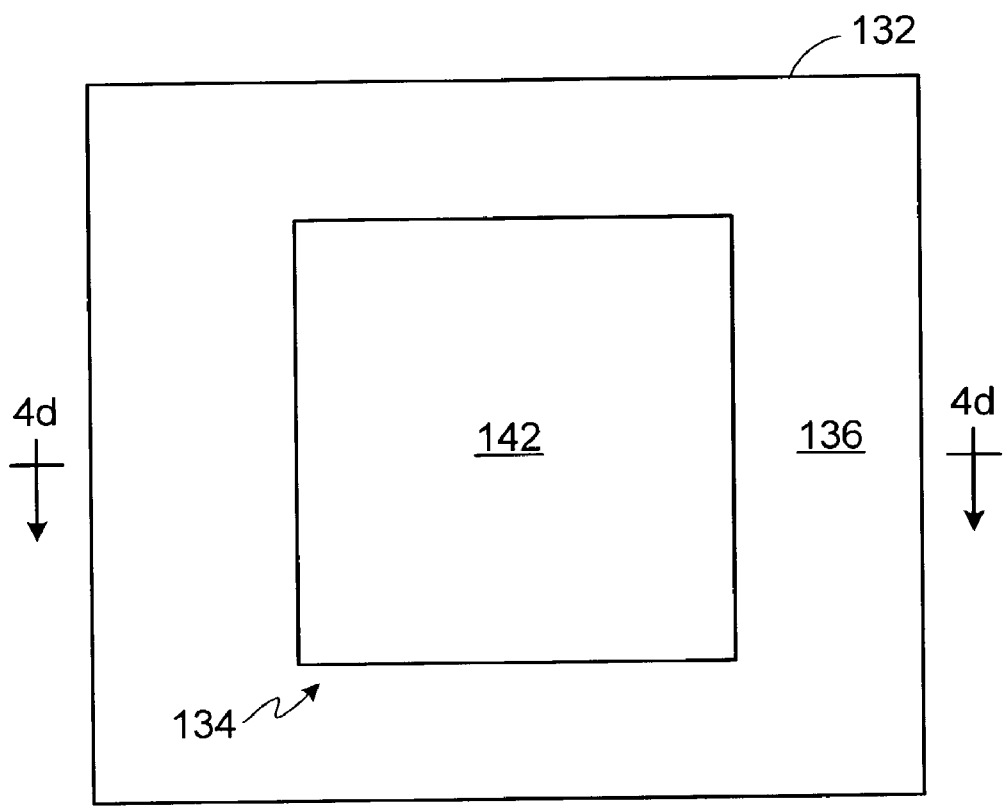
FIG. 4c is a plan view illustrating a step in a fuel cell assembly manufacturing process in accordance with a preferred embodiment of a present invention.
Figure 4D:
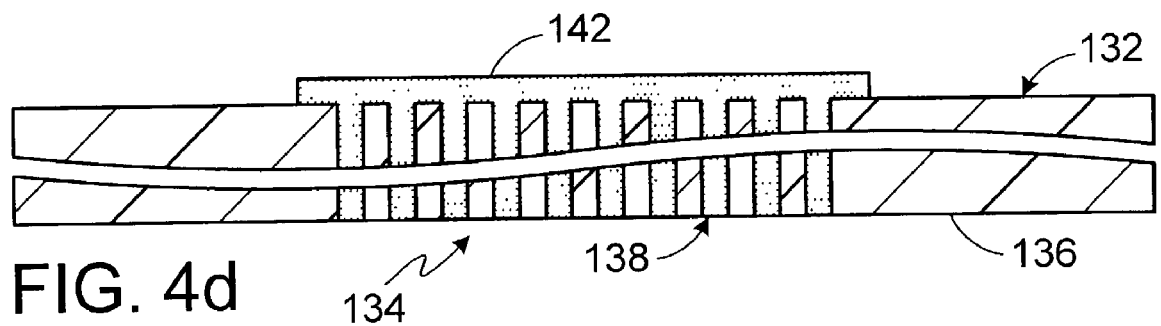
FIG. 4d is a section view taken along line 4d—4d in FIG. 4c.
Figure 4E:
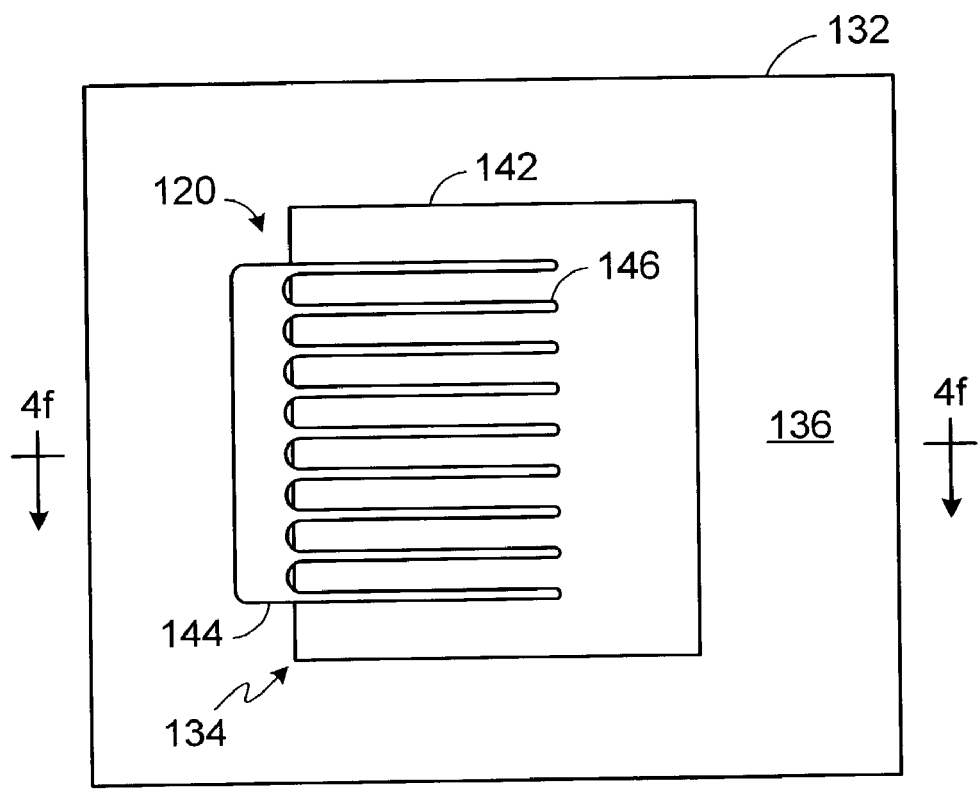
FIG. 4e is a plan view illustrating a step in a fuel cell assembly manufacturing process in accordance with a preferred embodiment of a present invention.
Figure 4F:
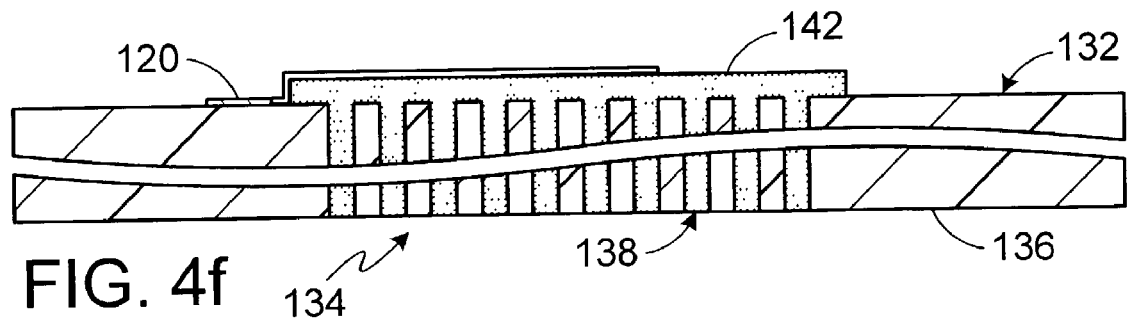
FIG. 4f is a section view taken along line 4f—4f in FIG. 4e.
Figure 4G:
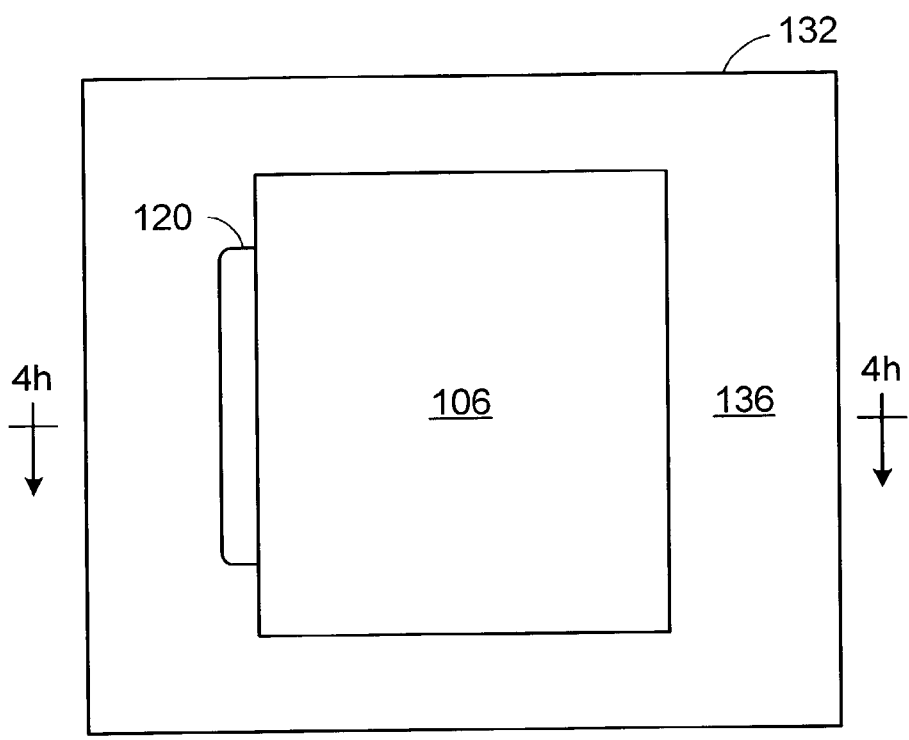
FIG. 4g is a plan view illustrating a step in a fuel cell assembly manufacturing process in accordance with a preferred embodiment of a present invention.
Figure 4H:
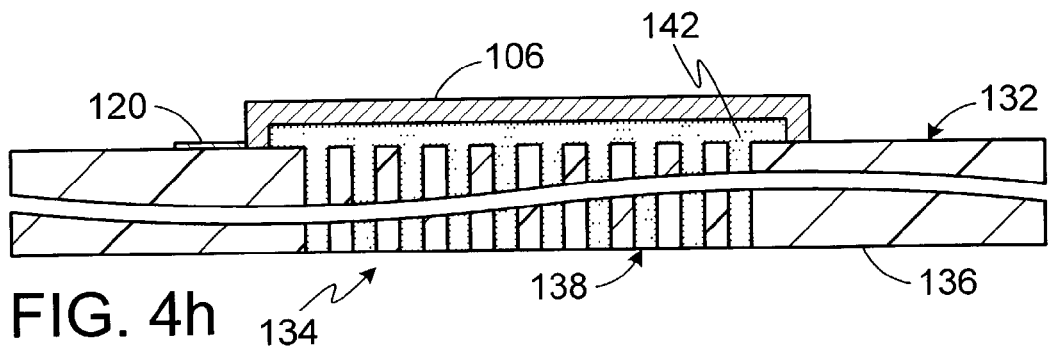
FIG. 4h is a section view taken along line 4h—4h in FIG. 4g.
Figure 4I:
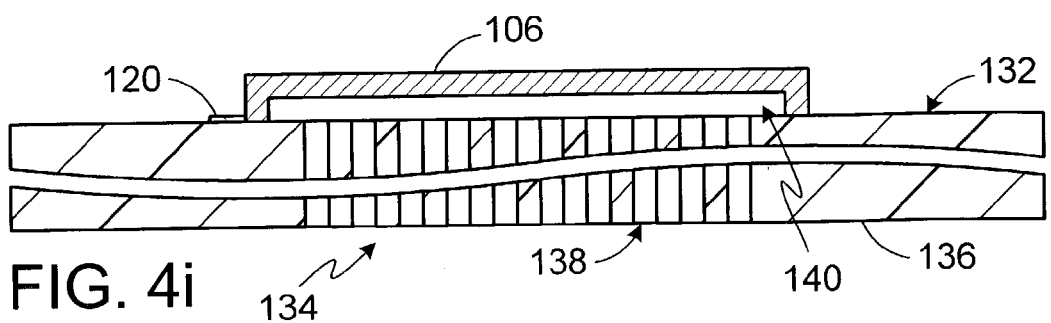
FIG. 4i is a section view illustrating a step in a fuel cell assembly manufacturing process in accordance with a preferred embodiment of a present invention.
Figure 4J:
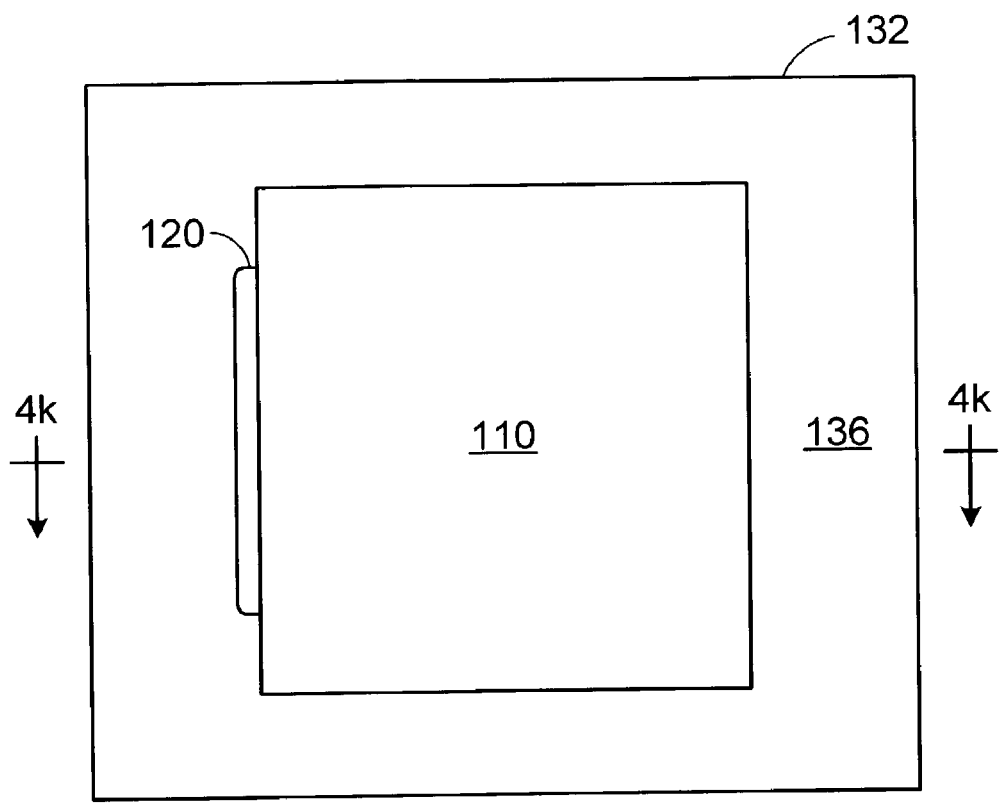
FIG. 4j is a plan view illustrating a step in a fuel cell assembly manufacturing process in accordance with a preferred embodiment of a present invention.
Figure 4K:
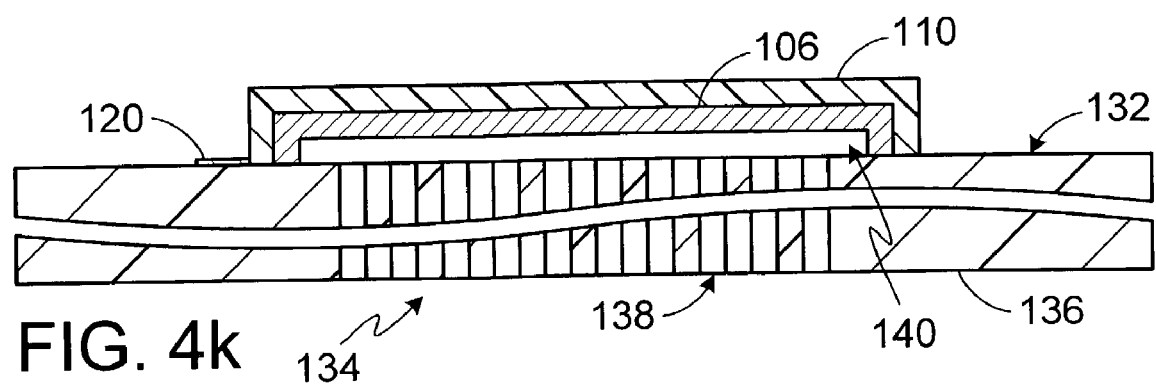
FIG. 4k is a section view taken along line 4k—4k in FIG. 4j.
Figure 4L:
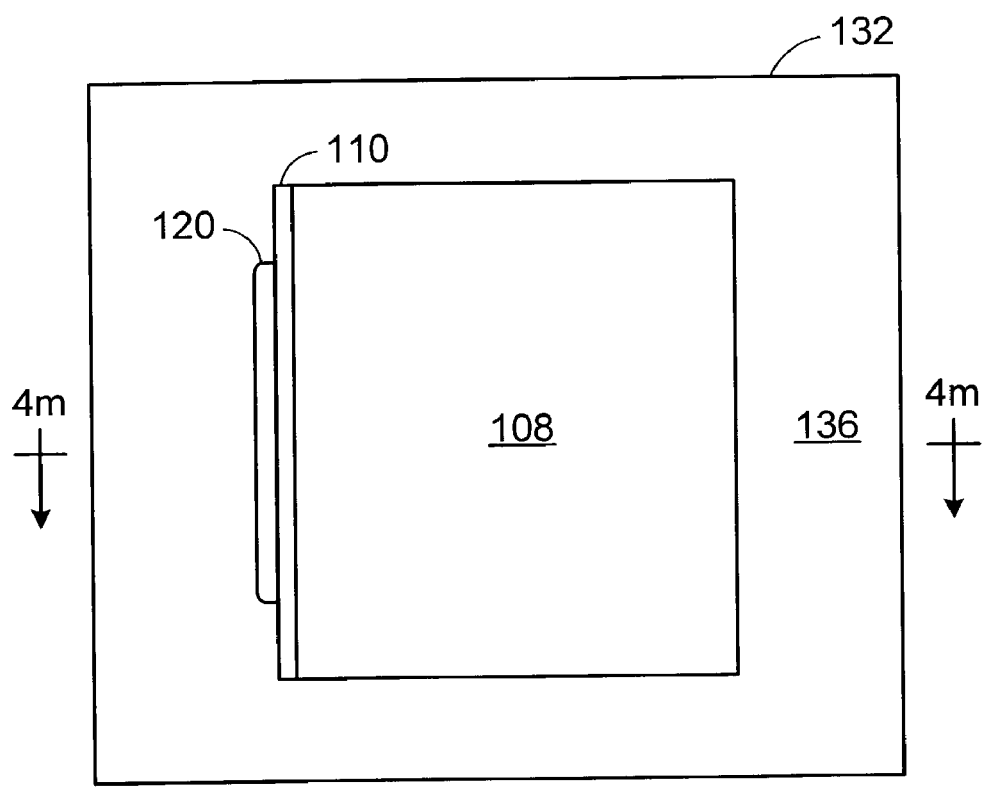
FIG. 4l is a plan view illustrating a step in a fuel cell assembly manufacturing process in accordance with a preferred embodiment of a present invention.
Figure 4M:
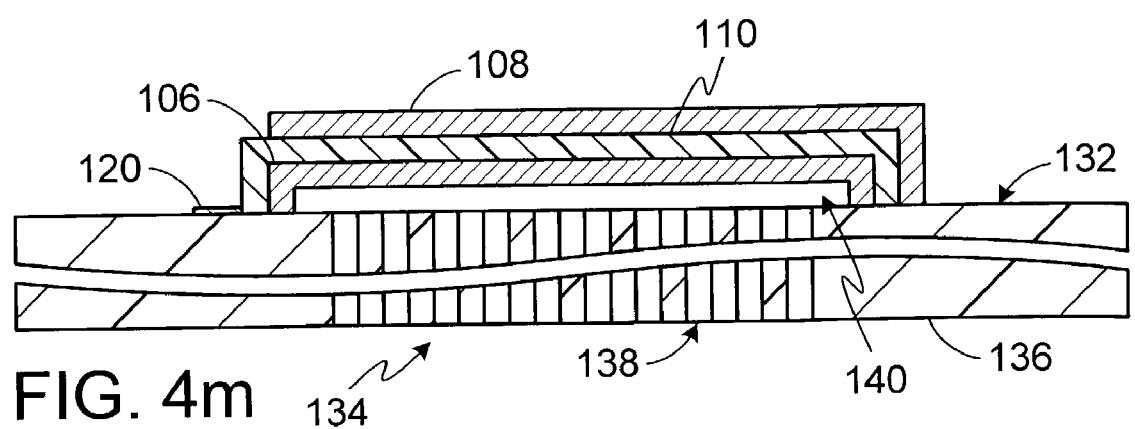
FIG. 4m is a section view taken along line 4m—4m in FIG. 4l.
Figure 4N:
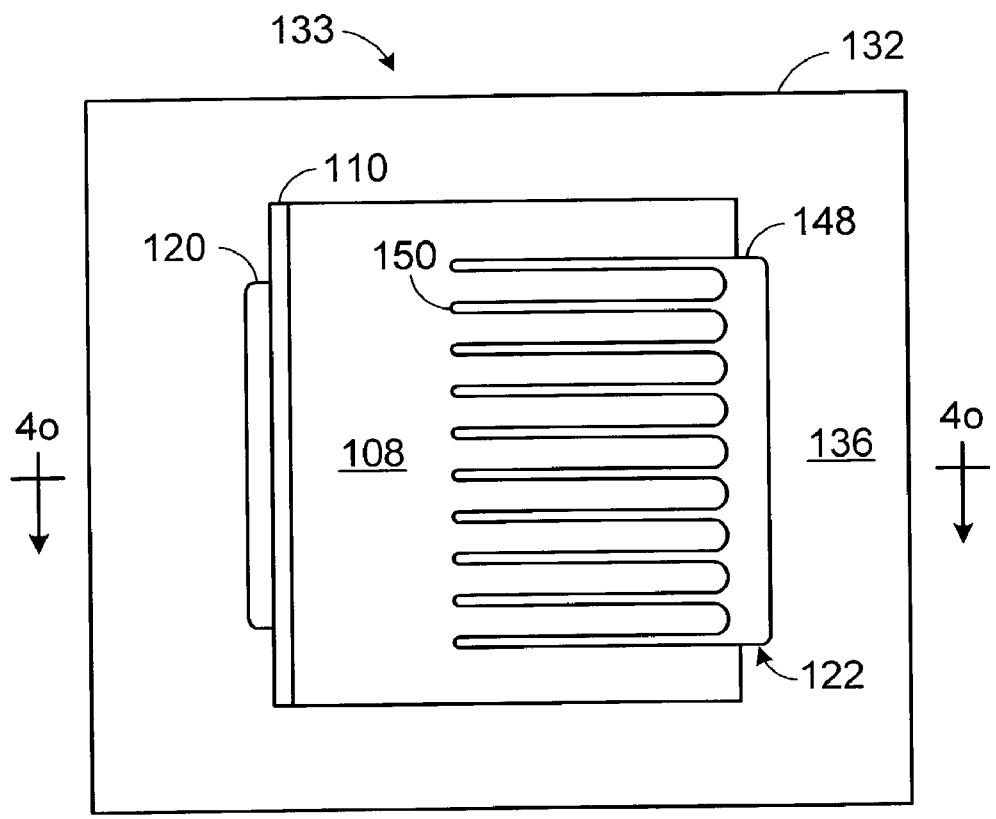
FIG. 4n is a plan view illustrating a step in a fuel cell assembly manufacturing process in accordance with a preferred embodiment of a present invention.

Turning to manufacture, the fuel cell assembly 133 illustrated in FIG. 2 may be manufactured by the exemplary single-sided method illustrated in FIGS. 4*a*–4*n*. Referring first to FIGS. 4*a* and 4*b*, the substrate 132 may be created by forming the apertures 138 in a sheet of substrate material through a process that removes material from the sheet. Suitable methods of removing material from the sheet include mechanical cutting processes, such as punching, drilling and laser ablation. In those instances where the substrate 132 is a ceramic substrate, the apertures 138 will preferably be formed in the substrate material prior to firing while the material is still in the green state because a relatively simple hole punch may be used. The punched green substrate material may then be fired to burn out the organic solvents and binders and sinter together the ceramic materials, thereby forming the substrate 132. The size of the pre-fired punched apertures 138 should also be slightly larger than the desired size because they will shrink (typically about 15%) during firing. The apertures 138 may also be formed by punching ceramic material that has already been fired. Here, however, more sophisticated cutting methods (such as laser ablation) may be required. Additionally, in those instances where polymeric materials are employed, the substrate 132 may be molded with the apertures 138 already in place.

There are a number of advantages associated with substrates formed in the manner described above. For example, the materials are relatively inexpensive, as compared to the materials that are used to form the anodes and cathodes. Also, mechanical punching facilitates precise simple control over the size of the apertures 138, as does laser ablation and molding. The present substrates also facilitate backside metallization, whereas conventional porous substrates do not.

Next, as illustrated in FIGS. 4*c* and 4*d*, sacrificial material 142 is used to form a layer over the reactant permeable region 134 and to fill the apertures 138. The sacrificial material 142 will ultimately be removed, thereby re-opening the apertures 138 and forming the reactant gap 140. The volume of sacrificial material 142 on the surface of the substrate 132 should, therefore, correspond to the volume of the reactant gap 140. Suitable sacrificial materials include polymers such as wax and epoxies, metals such as aluminum, and glass. With respect to processes, the sacrificial layer 142 may be formed by screen printing, immersion or spin coating.

Turning to FIGS. 4*e* and 4*f*, the next step in the exemplary process is the formation of the anode-side (or cathode-side if the fuel cell 102 is inverted) current collector 120. The exemplary current collector 120 includes a base portion 144 that is carried by the non-permeable support region 136 of the substrate 132 and a plurality of finger-like portions 146 that are formed over the layer of sacrificial material 142. The base portion 144 may be connected to the interconnects associated with the fuel cell packaging. Suitable current collector materials include stainless steel, silver, gold and platinum. With respect to processes, the current collector 120 may be formed by screen printing or deposition and etch techniques.

The formation of the electrode that is closest to the substrate 132, which in the exemplary fuel cell 102 is the anode 106, is the next step in the exemplary process. As illustrated for example in FIGS. 4*g* and 4*h*, the anode 106 is formed over the top (in the illustrated orientation) and sides of the layer of sacrificial material 142 and over all of the current collector 120 except for a portion of the base portion 144, which remains exposed for connection during packaging of the fuel cell 102. So configured, the anode 106 defines a sealed region, which will ultimately become the reactant gap 140, that is only accessible by way of the reactant permeable region 134. The anode 106 is also bonded to the substrate 132.

As noted above, a suitable anode 106 is a porous, ceramic and metal composite film that is about 1–100 μm thick. Such an anode may be formed by processes including, for example, screen printing and other printing techniques, lithography, and physical vapor deposition ("PVD") and etch techniques. After the anode material has hardened, the partially completed fuel cell assembly is heated (or "fired") to a temperature of about 1400° C. (the temperature being dependent on the deposition technique). This will cause the sacrificial material 142 to burn away in those instances where the sacrificial material is a polymer. Chemical etching may be used to remove the sacrificial material 142 in those instances where it is glass or metal. In either case, removal of the sacrificial material 142 will create the reactant gap 140 between the reactant permeable region 134 of the substrate 132 and the inner surface of the anode 106, as well as re-open the apertures 138 in the reactant permeable region 134. [FIG. 4i.] It should be noted that, in those instances where the sacrificial material 142 is glass or metal, the removal of the sacrificial material may take place at any point within the process and may even be the last step in the process.

Referring to FIGS. 4j and 4k, the next step in the exemplary process is the formation of the electrolyte 110. The electrolyte 110 is formed over the top surface of the anode 106 and any side surface that will be exposed after packaging. As noted above, a suitable electrolyte 110 is a non-porous ceramic film that is about 1–100 μm thick. Such an electrolyte may be formed by processes including, for example, screen printing and other printing techniques, lithography, and PVD and etch techniques. The partially completed fuel cell assembly will typically be fired at this point.

In the next step of the exemplary process, the cathode 108 is preferably formed over the substantial majority of the top surface and one of the four side surfaces of the electrolyte 110, as is illustrated for example in FIGS. 4l and 4m. As noted above, a suitable cathode 108 is a porous ceramic film that is about 1–100 μm thick. Such a cathode may be formed by processes including, for example, screen printing and other printing techniques, lithography, and PVD and etch techniques. Typically, the partially completed fuel cell assembly will be fired to complete the formation of the cathode 108.

Figure 4O:
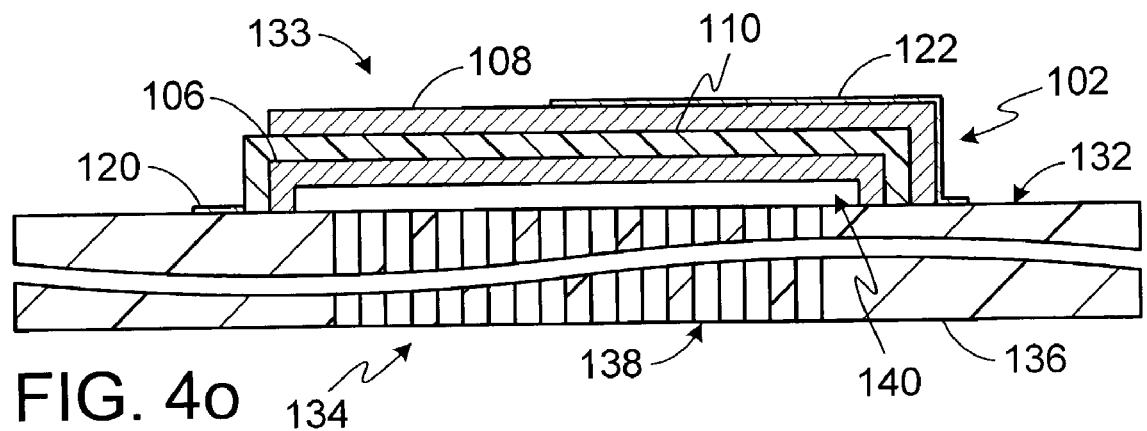
FIG. 4o is a section view taken along line 4o—4o in FIG. 4n.

Turning to FIGS. 4n and 4o, the exemplary fuel cell 102 is completed by the formation of the cathode-side current collector 122. The current collector 122 includes a base portion 148 that is carried by the non-permeable support region 136 of the substrate 132 and a plurality of finger-like portions 150 that are formed over the cathode 108. The base portion 148 may be connected to the interconnects associated with the fuel cell packaging. As noted above, suitable current collector materials include stainless steel, silver, gold and platinum, while suitable current collector formation processes include screen printing and deposition and etch techniques. The fuel cell assembly will typically be fired to complete the process.

Figure 5:
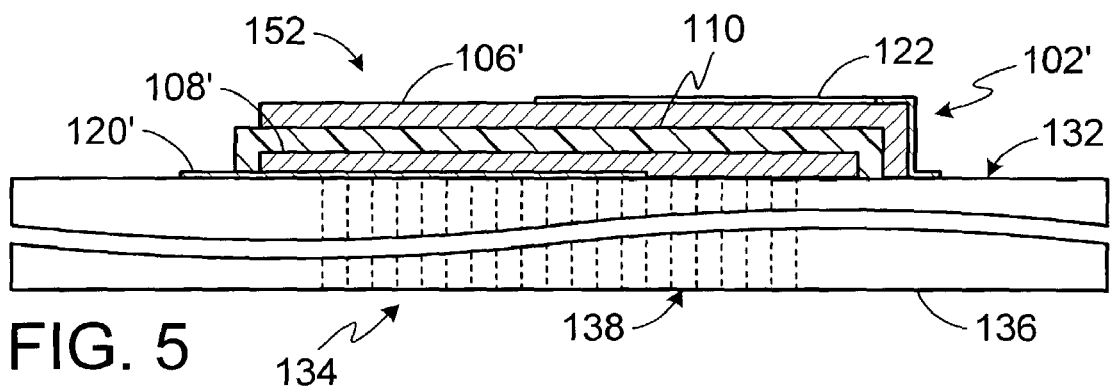
FIG. 5 is a side, partial section view of a fuel cell assembly in accordance with a preferred embodiment of a present invention.

Another exemplary fuel cell assembly, which consists of a fuel cell 102' and a substrate 132, is generally represented by reference numeral 152 in FIG. 5. The fuel cell assembly 152 illustrated in FIG. 5 is substantially similar to the fuel cell assembly 133 illustrated in FIG. 2 and similar elements are represented by similar reference numerals. Detailed descriptions of many of the substantially identical aspects of the fuel cell 102' have been omitted for the sake of brevity, and the prior descriptions of these aspects with respect to the fuel cell 102 are incorporated herein by reference. Here, however, the reactant gap 140 has been omitted and the electrode and current collector closest to the substrate 132 in the exemplary fuel cell 102' are formed on the reactant permeable region 134. Such an arrangement facilitates the use of thinner and/or weaker materials because the fuel cell 102' does not have to be self-supporting. Additionally, although the positions of the anode 106' and cathode 108' may be reversed, the closest electrode to the substrate in the exemplary fuel cell 102' is the cathode.

The fuel cell assembly 152 may, for example, be incorporated into the fuel cell system 100 and stack 104 described above with reference to FIGS. 1 and 3. The individual assemblies 152 would be rotated 180° from the orientation illustrated in FIG. 3 because the cathodes 108' the closest electrode to the substrate 132.

Figure 6A:
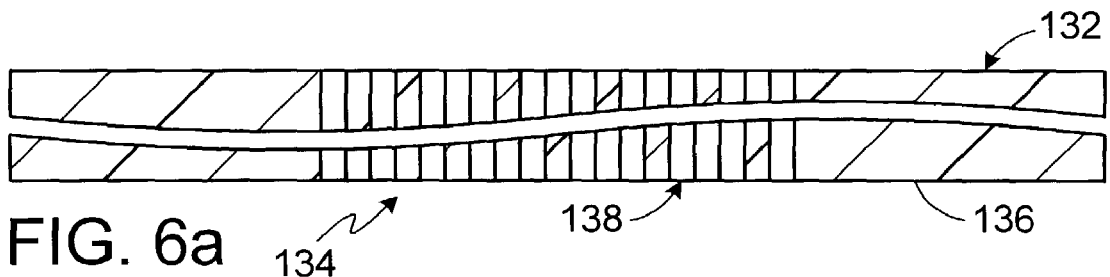
FIG. 6a is a section view illustrating a step in a fuel cell assembly manufacturing process in accordance with a preferred embodiment of a present invention.
Figure 6B:
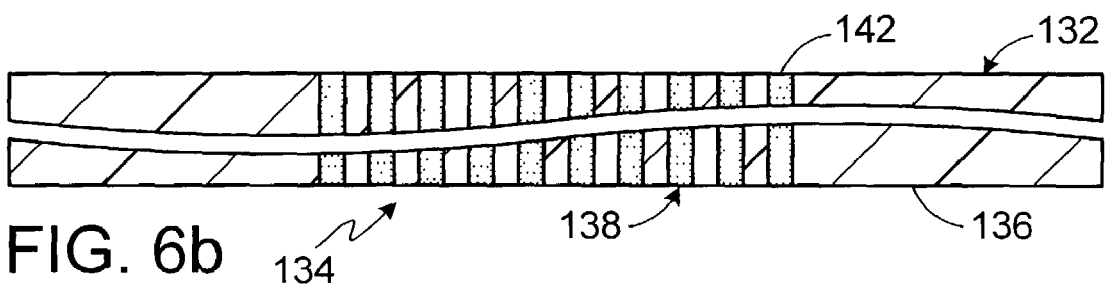
FIG. 6b is a section view illustrating a step in a fuel cell assembly manufacturing process in accordance with a preferred embodiment of a present invention.

One exemplary method of manufacturing the fuel cell assembly 152 is illustrated in FIGS. 6a–6j. This method is substantially identical to the method described above with reference to FIGS. 4a–4o. Accordingly, detailed descriptions of many of the substantially identical aspects of the method have been omitted for the sake of brevity, and the prior descriptions of these aspects are incorporated herein by reference. Referring first to FIG. 6a, the substrate 132, which includes the reactant permeable region 134 and the non-permeable support region 136, is formed in the manner described above with reference to FIGS. 4a and 4b. Sacrificial material 142 is then used to fill the apertures 138 in the reactant permeable region 134. [FIG. 6b.] There is, however, no additional material on top of the reactant permeable region 134. The sacrificial material 142 (e.g. polymers such as wax and epoxies, metals such as aluminum, or glass) may be deposited by techniques such as screen printing, immersion and spin coating, as described above with reference to FIGS. 4c and 4d.

Figure 6C:
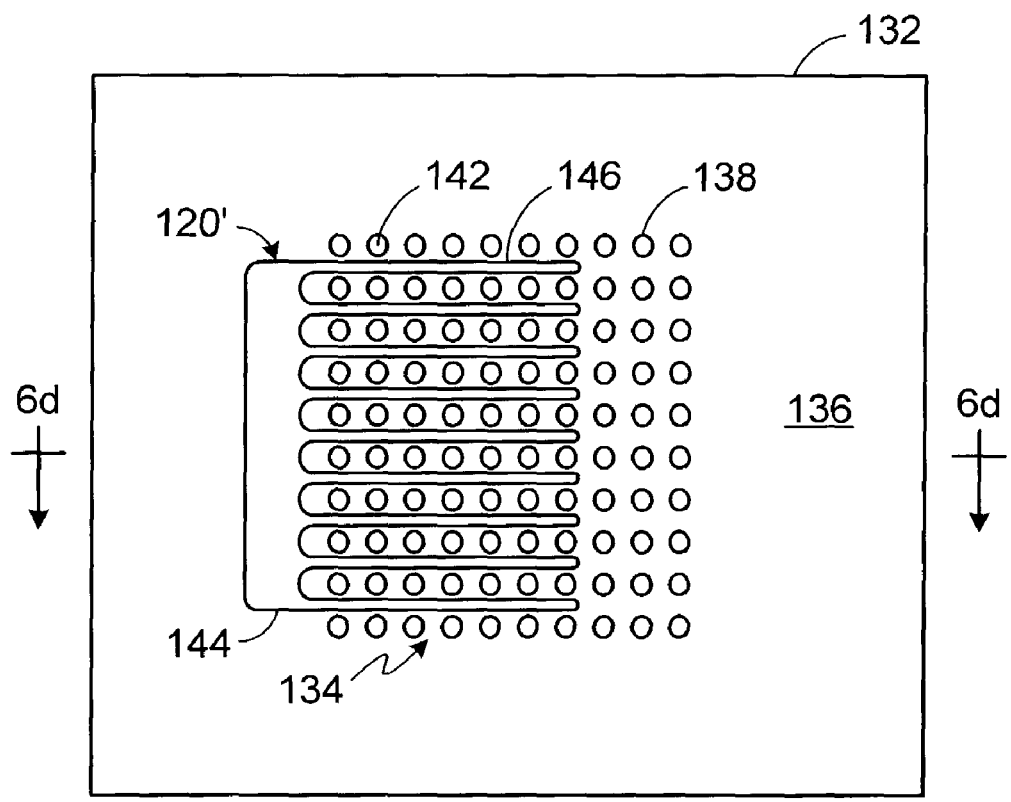
FIG. 6c is a plan view illustrating a step in a fuel cell assembly manufacturing process in accordance with a preferred embodiment of a present invention.
Figure 6D:
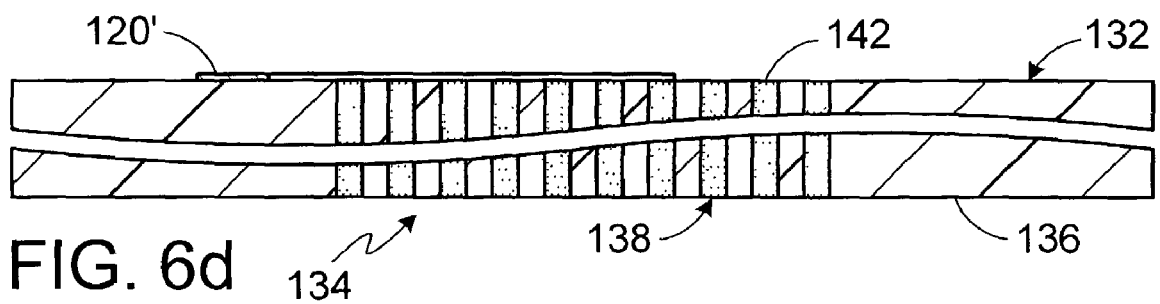
FIG. 6d is a section view taken along line 6d—6d in FIG. 6c.

Referring to FIGS. 6c and 6d, the formation of the current collector 120' is the next step in the exemplary process. The current collector 120' is formed in essentially the same manner as the current collector 120. [See the discussion above with reference to FIGS. 4e and 4f.] Here, however, the entire current collector 120' is formed on the surface of the substrate 132 and care must be taken to insure that the current collector does not interfere with reactant flow. In the exemplary implementation, the finger-like portions 146 of the current collector 120' are positioned between the apertures 138 in the reactant permeable region 134.

Figure 6E:
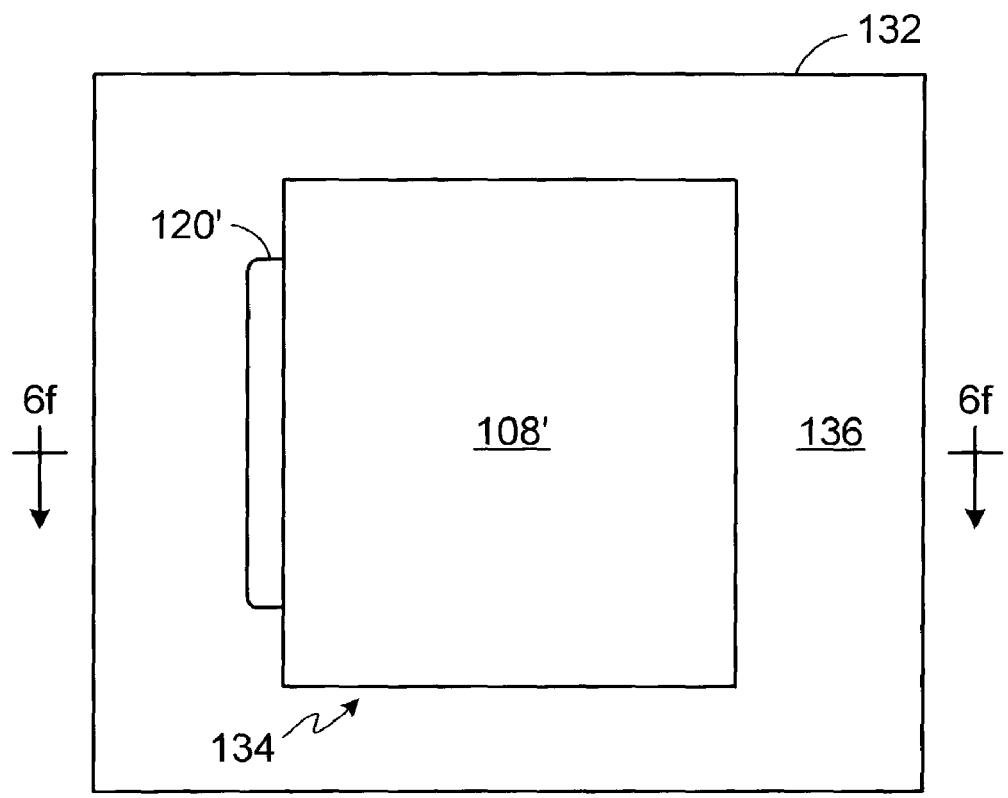
FIG. 6e is a plan view illustrating a step in a fuel cell assembly manufacturing process in accordance with a preferred embodiment of a present invention.
Figure 6F:
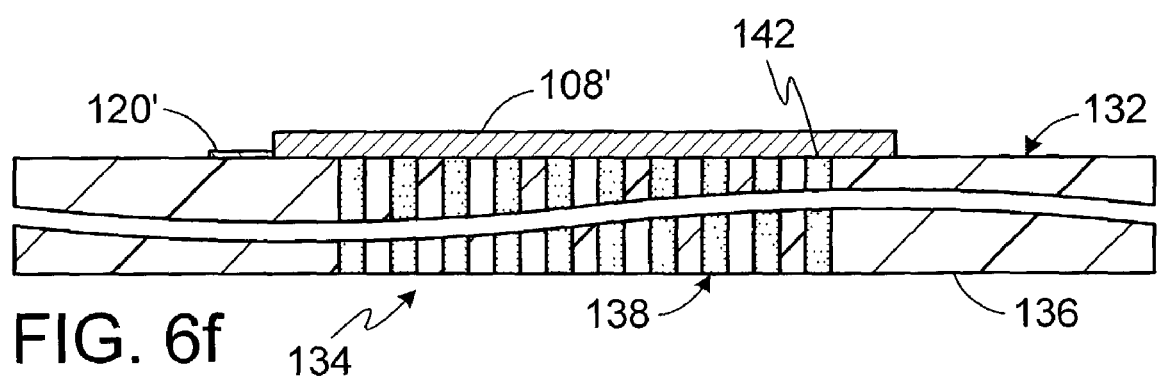
FIG. 6f is a section view taken along line 6f—6f in FIG. 6e.
Figure 6G:
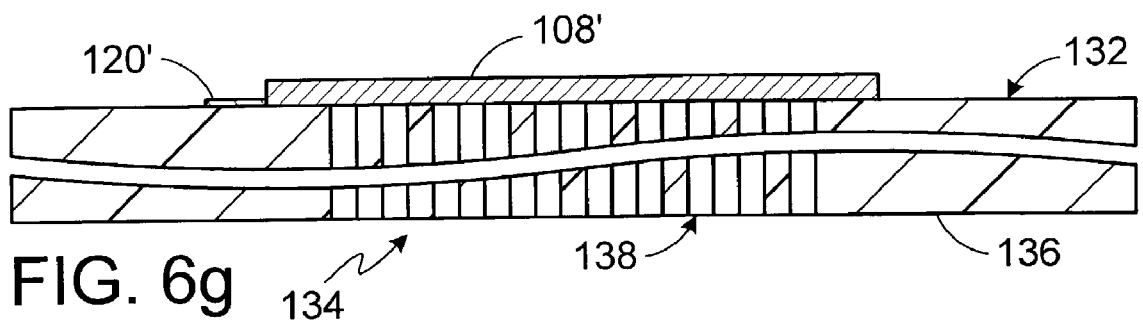
FIGS. 6g–6j are section views illustrating steps in a fuel cell assembly manufacturing process in accordance with a preferred embodiment of a present invention.
Figure 6H:
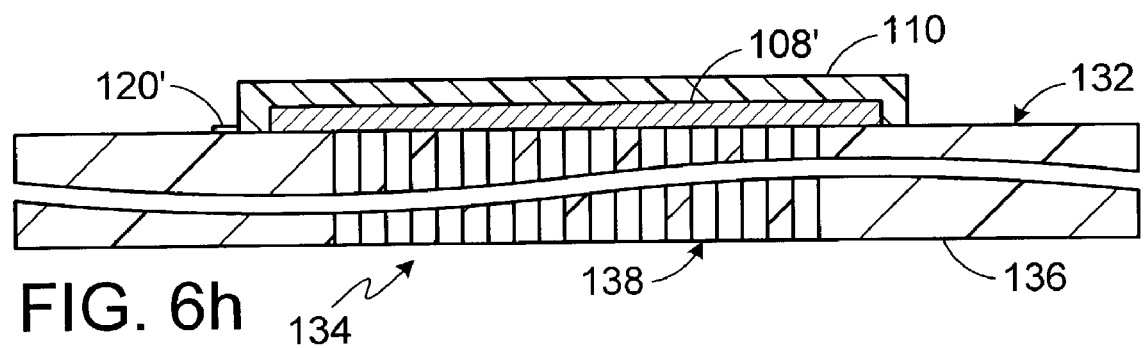
Figure 6I:
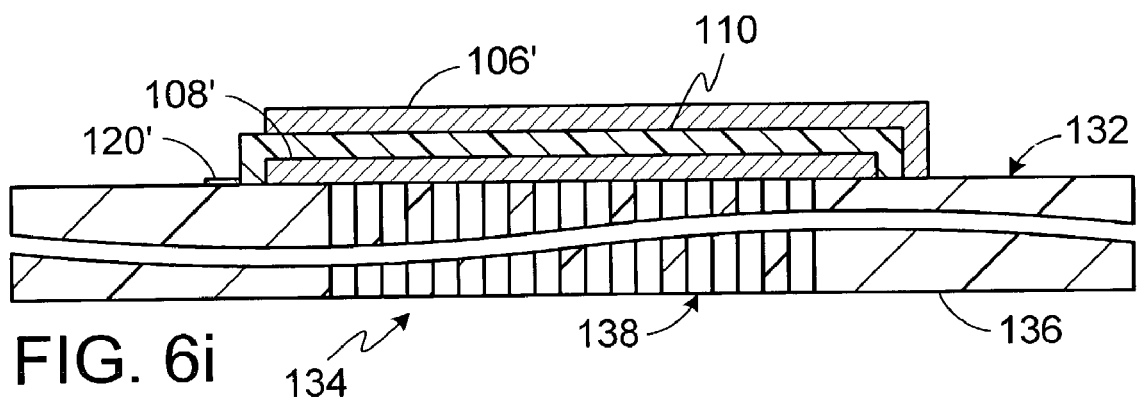
Figure 6J:
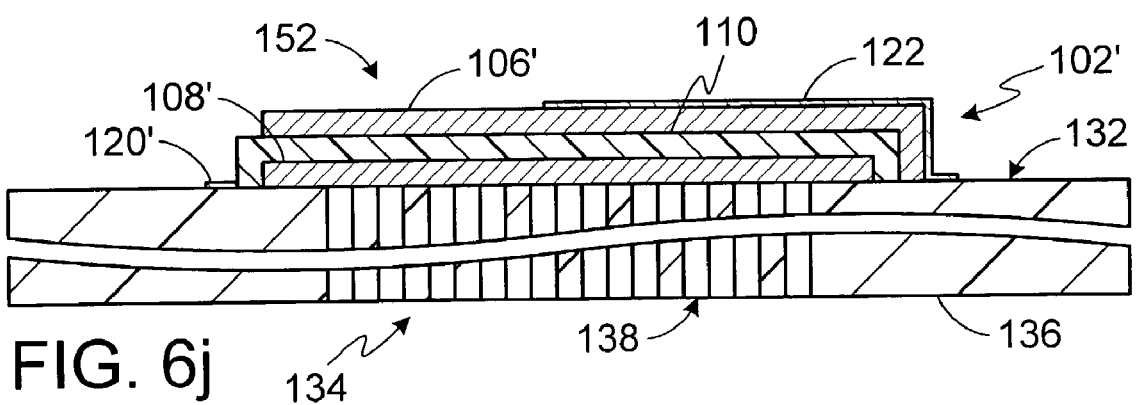

The cathode 108' is then formed over the reactant permeable region 134 of the substrate 132, as well as the majority of the current collector 120', as illustrated for example in FIGS. 6e and 6f. An exemplary process for forming the cathode 108' is described above with reference to FIGS. 4l and 4m. After the cathode material has hardened, the partially completed fuel cell assembly is fired, which also causes polymeric sacrificial material 142 to burn away and reopens the apertures 138. [FIG. 6g.] As noted above, chemical etching may be used to remove the sacrificial material 142 when it is a metal or glass at any point during the process.

The next steps in the exemplary process are the formation of the electrolyte 110 (FIG. 6h), the anode 106' (FIG. 6i) and the current collector 122 (FIG. 6j), which completes the formation of the exemplary fuel cell 102' and fuel cell assembly 152. More specifically, the electrolyte 110 may be formed in the manner described above with reference to FIGS. 4j and 4k, the anode 106' may be formed in the manner described above with reference to FIGS. 4g and 4h, and the current collector 122 may be formed in the manner described above with reference to FIGS. 4n and 4o.

Figure 7:
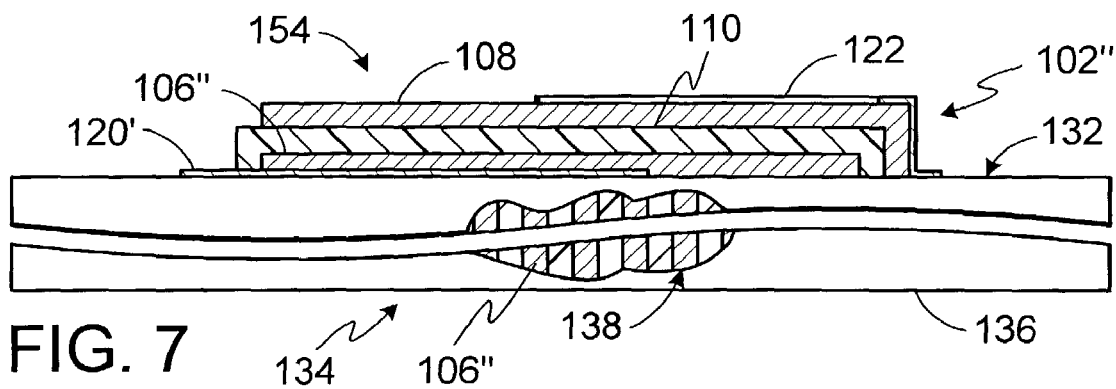
FIG. 7 is a side, partial section, cutaway view of a fuel cell assembly in accordance with a preferred embodiment of a present invention.

Still another exemplary fuel cell assembly, which consists of a fuel cell 102" and a substrate 132, is generally represented by reference numeral 154 in FIG. 7. The fuel cell assembly 154 illustrated in FIG. 7 is substantially identical to the fuel cell assembly 152 illustrated in FIG. 5 and similar elements are represented by similar reference numerals. Detailed descriptions of many of the substantially identical aspects of the fuel cell 102" have been omitted for the sake of brevity, and the prior descriptions of these aspects with respect to the exemplary fuel cells 102 and 102' are incorporated herein by reference. Here, however, portions of the electrode closest to the substrate 132 extend into the reactant permeable region 134 of the substrate. Such an arrangement eliminates the need to use sacrificial material during the manufacturing process. Additionally, although the respective positions of the anode 106" and cathode 108 may be reversed, the closest electrode to the substrate in the exemplary fuel cell 102" is the anode.

The fuel cell assembly 154 may, for example, be incorporated into the fuel cell system 100 and stack 104 described above with reference to FIGS. 1 and 3.

Figure 8A:
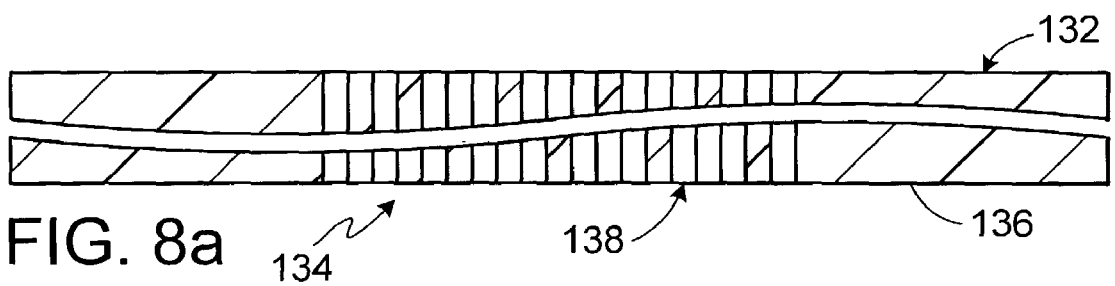
FIG. 8a is a section view illustrating a step in a fuel cell assembly manufacturing process in accordance with a preferred embodiment of a present invention.
Figure 8B:
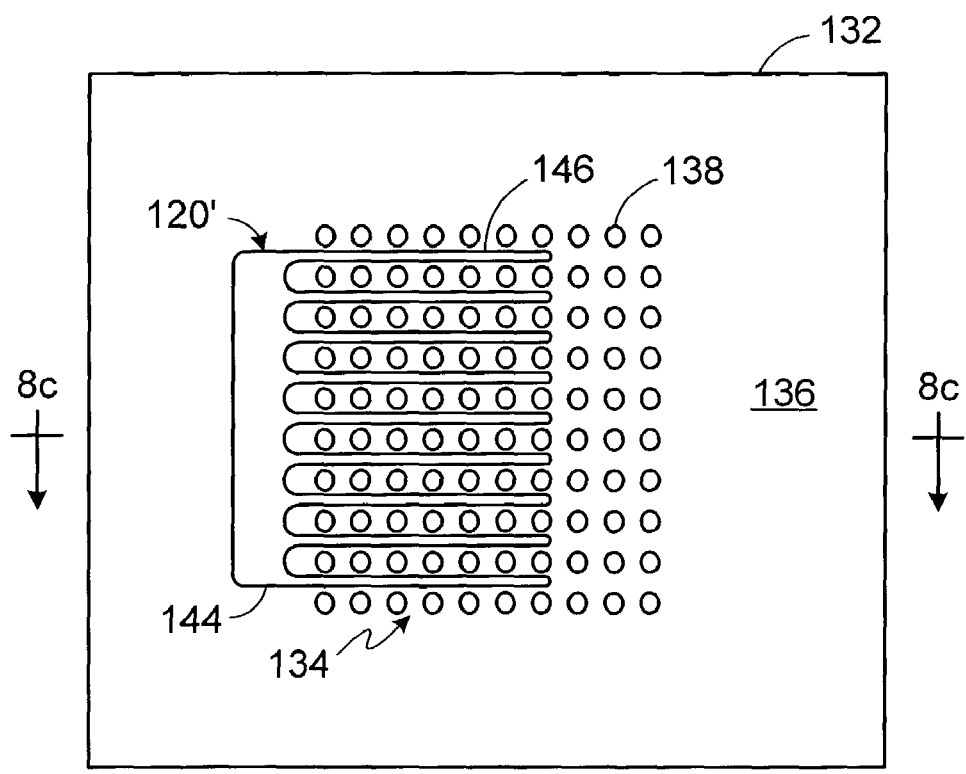
FIG. 8b is a plan view illustrating a step in a fuel cell assembly manufacturing process in accordance with a preferred embodiment of a present invention.
Figure 8C:
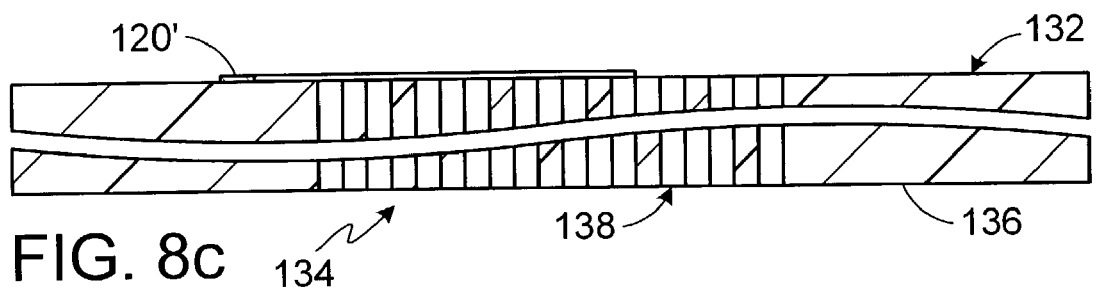
FIG. 8c is a section view taken along line 8c—8c in FIG. 8b.
Figure 8D:
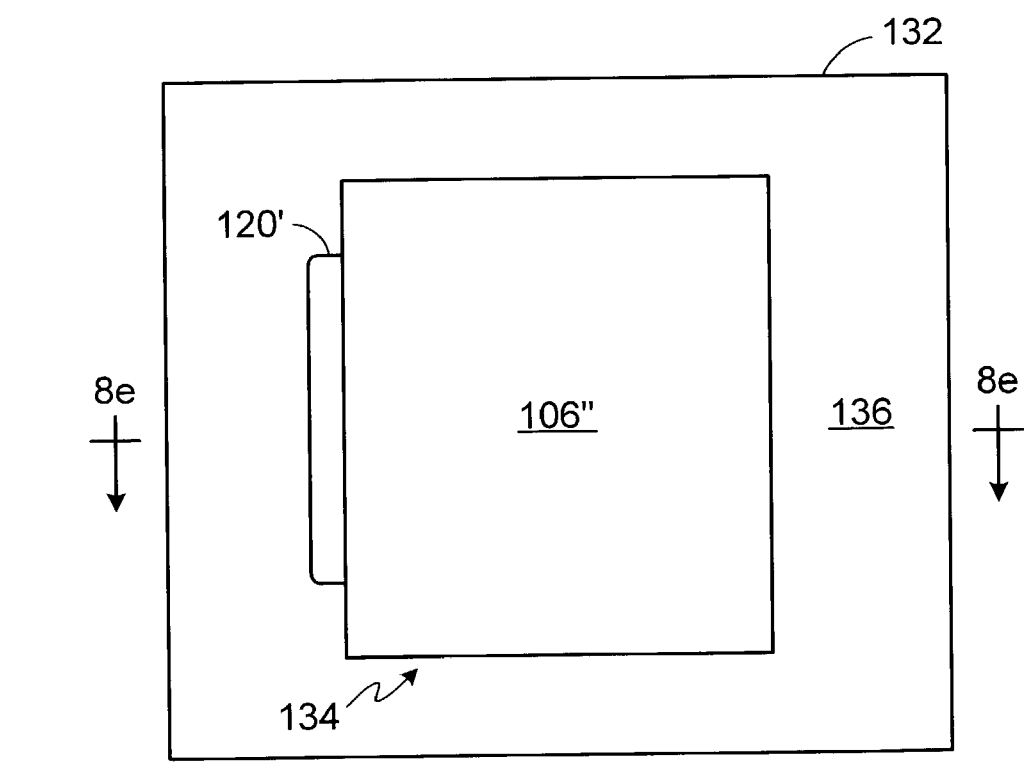
FIG. 8d is a plan view illustrating a step in a fuel cell assembly manufacturing process in accordance with a preferred embodiment of a present invention.
Figure 8E:
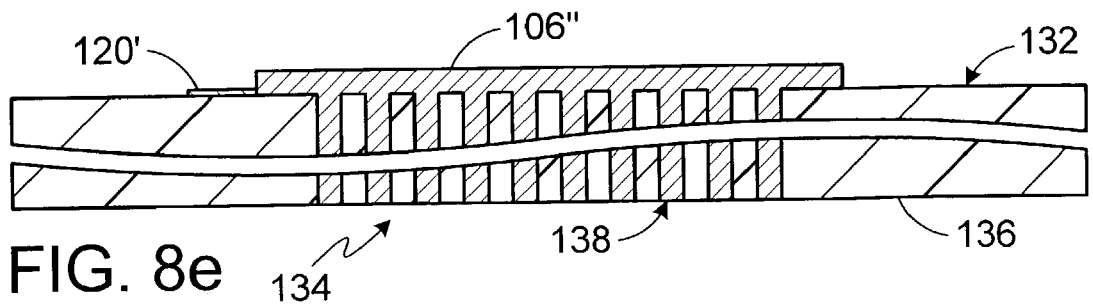
FIG. 8e is a section view taken along line 8e—8e in FIG. 8d.
Figure 8F:
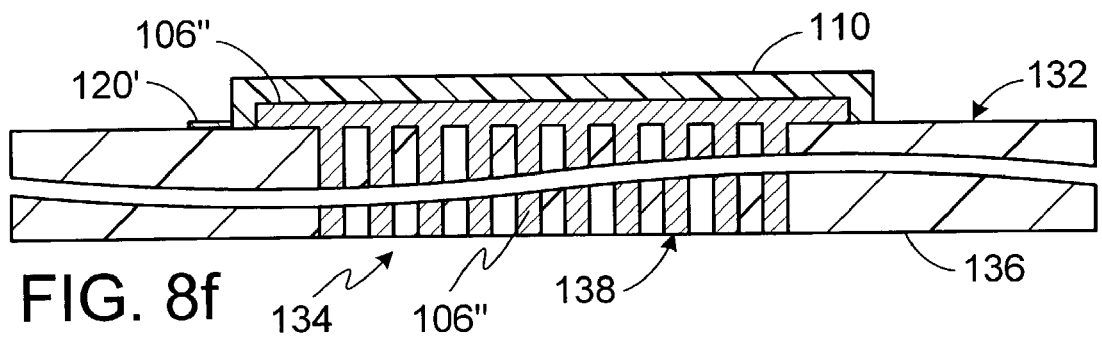
FIGS. 8f–8h are section views illustrating steps in a fuel cell assembly manufacturing process in accordance with a preferred embodiment of a present invention.
Figure 8G:
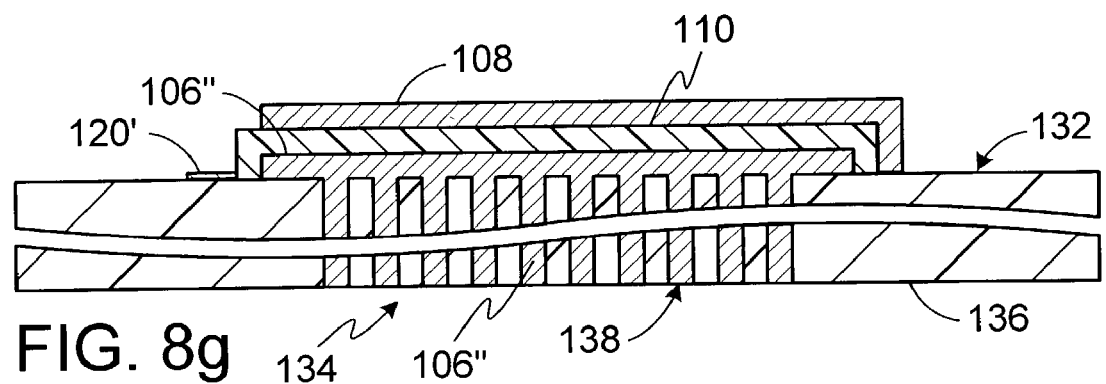
Figure 8H:
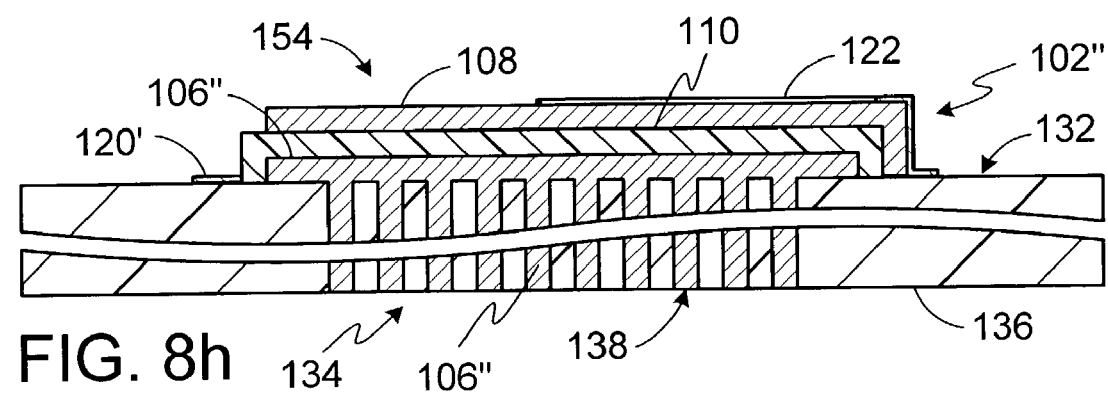

An exemplary method of manufacturing the exemplary fuel cell assembly 154 is illustrated in FIGS. 8a–8h. This method is substantially identical to the methods described above with reference to FIGS. 4a–4o and 6a–6h. For example, the substrate 132 illustrated in FIG. 8a is formed in the manner described above with reference to FIGS. 4a and 4b. Accordingly, detailed descriptions of many of the substantially identical aspects of the method have been omitted for the sake of brevity, and the prior descriptions of these aspects are incorporated herein by reference. In contrast to the methods described above, however, no sacrificial material is used. After the substrate 132 is formed, the next steps in the process are the formation of the current collector 120' (FIGS. 8b and 8c) and the formation of the anode 106" over the reactant permeable region 134 (FIGS. 8d and 8e). Portions of the anode 106" also fill the apertures 138. The formation of the current collector 120' and anode 106" may be accomplished in the manner described above with reference to FIGS. 4e–4h.

The next steps in the exemplary process are the formation of the electrolyte 110 (FIG. 8f), the cathode 108 (FIG. 8g) and the current collector 122 (FIG. 8h), which completes the formation of the exemplary fuel cell 102" and fuel cell assembly 154. The electrolyte 110 may be formed in the manner described above with reference to FIGS. 4j and 4k, the cathode 108 may be formed in the manner described above with reference to FIGS. 4l and 4m, and the current collector 122 may be formed in the manner described above with reference to FIGS. 4n and 4o.

Figure 9:
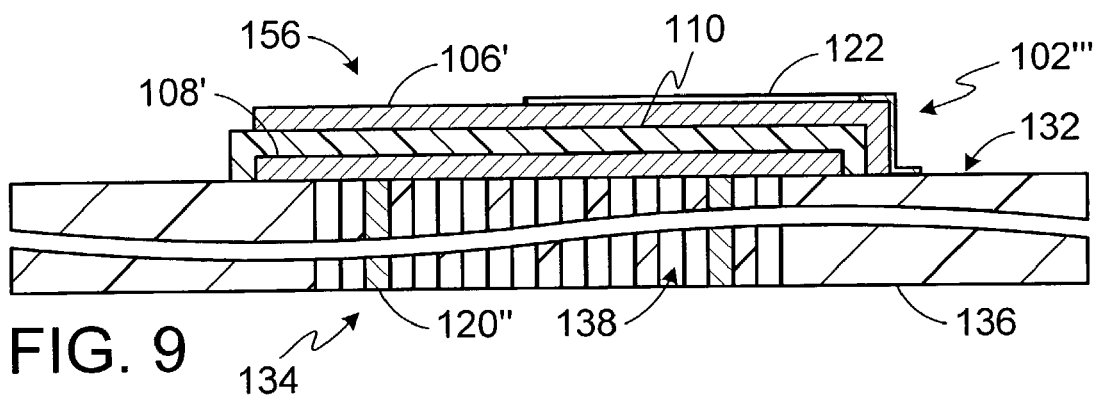
FIG. 9 is a side, section view of a fuel cell assembly in accordance with a preferred embodiment of a present invention.

Another exemplary fuel cell assembly, which consists of a fuel cell 102''' and a substrate 132, is generally represented by reference numeral 156 in FIG. 9. The fuel cell assembly 156 illustrated in FIG. 9 is substantially identical to the fuel cell assembly 152 illustrated in FIG. 5 and similar elements are represented by similar reference numerals. Detailed descriptions of many of the substantially identical aspects of the fuel cell 102''' have been omitted for the sake of brevity, and the prior descriptions of these aspects with respect to the exemplary fuel cells 102, 102' and 102" are incorporated herein by reference. Here, however, the current collector closest to the substrate 132 is formed by a plurality of current collector elements 120" that extend through a small percentage (e.g. about 10%) of the apertures 138 in the reactant permeable region 134 of the substrate. Electrical connection to the current collector elements 120" may be made on the bottom side of the substrate 132. It should be noted that a similar current collector arrangement may also be employed in the exemplary embodiment illustrated in FIG. 2, although a few portions of the anode 106 will have to be in contact with the reactant permeable region 134 in order to make contact with the current collector elements 120" or the current collector elements 120" will have to extend through the reactant gap 140. The respective positions of the anode 106' and cathode 108' in FIG. 9 may also be reversed.

The fuel cell assembly 156 may, for example, be incorporated into the fuel cell system 100 and stack 104 described above with reference to FIGS. 1 and 3.

Figure 10A:
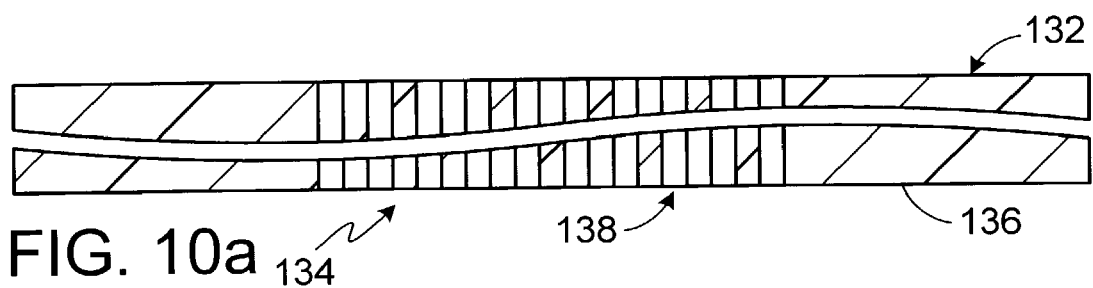
FIG. 10a is a section view illustrating a step in a fuel cell assembly manufacturing process in accordance with a preferred embodiment of a present invention.
Figure 10B:
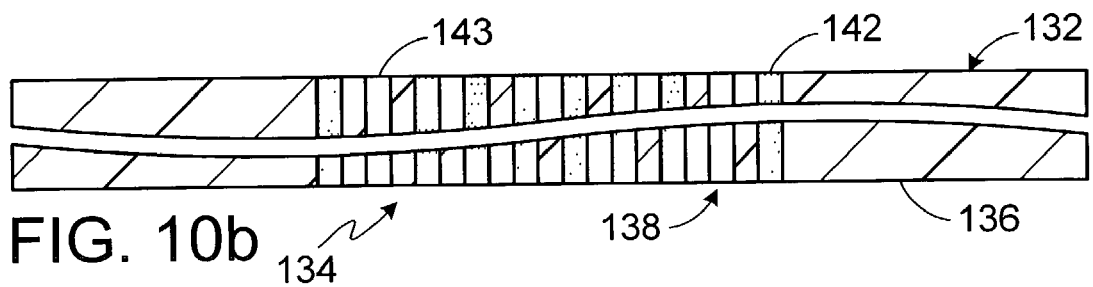
FIG. 10b is a section view illustrating a step in a fuel cell assembly manufacturing process in accordance with a preferred embodiment of a present invention.
Figure 10C:
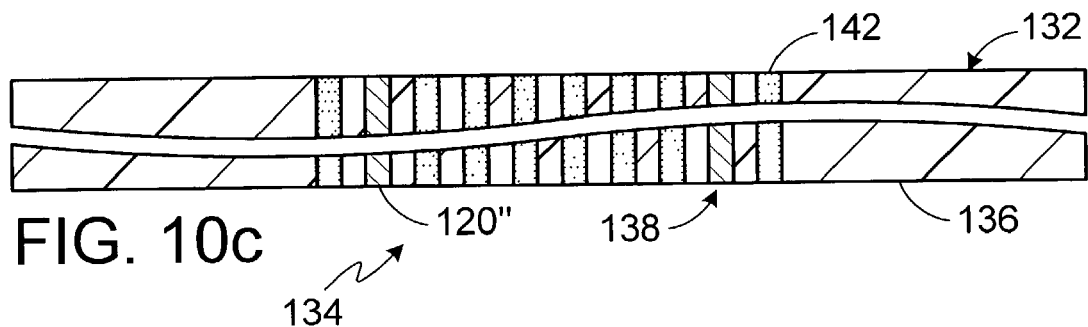
FIG. 10c is a plan view illustrating a step in a fuel cell assembly manufacturing process in accordance with a preferred embodiment of a present invention.

With respect to manufacturing, a portion of an exemplary method of manufacturing the exemplary fuel cell assembly 156 is illustrated in FIGS. 10a–10c. The overall method is substantially identical to the methods described above with reference to FIGS. 4a–4o and 6a–6h. For example, the substrate 132 illustrated in FIG. 10a is formed in the manner described above with reference to FIGS. 4a and 4b. Accordingly, detailed descriptions of many of the substantially identical aspects of the method have been omitted-for the sake of brevity, and the prior descriptions of these aspects are incorporated herein by reference. In contrast to the methods described above, however, the sacrificial material 142 is deposited into the majority of, but not all of, the apertures 138. [FIG. 10b.] This may be accomplished with processes such as screen printing, which facilitate precise placement of sacrificial material 142. Next, as illustrated for example in FIG. 10c, the current collector elements 120" may be formed in the remaining apertures 138 by processes such as screen printing. After the current collector elements 120" have been formed, the exemplary fuel cell assembly 156 may be completed in the manner described above with reference to FIGS. 6e–6j.

Figure 11A:
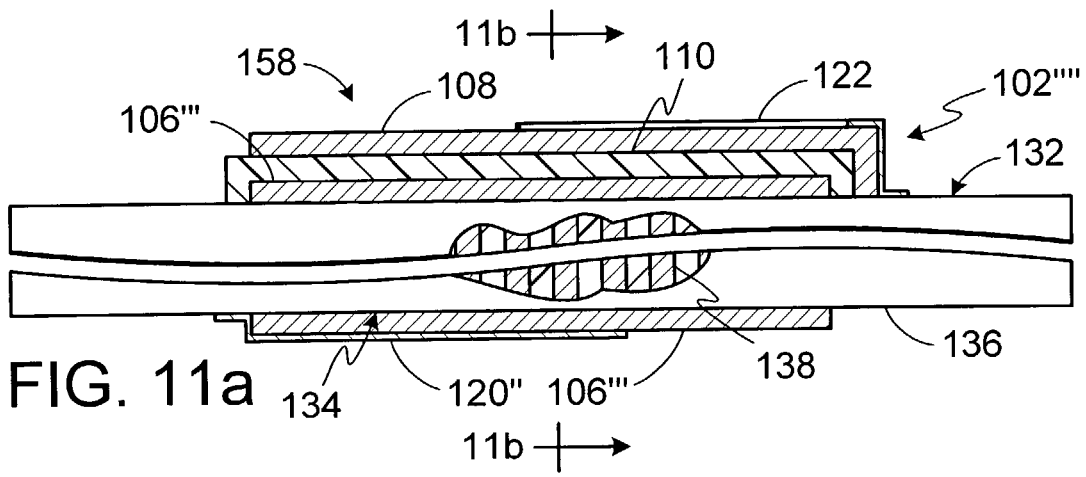
FIG. 11a is a side, partial section, cutaway view of a fuel cell assembly in accordance with a preferred embodiment of a present invention.
Figure 11B:
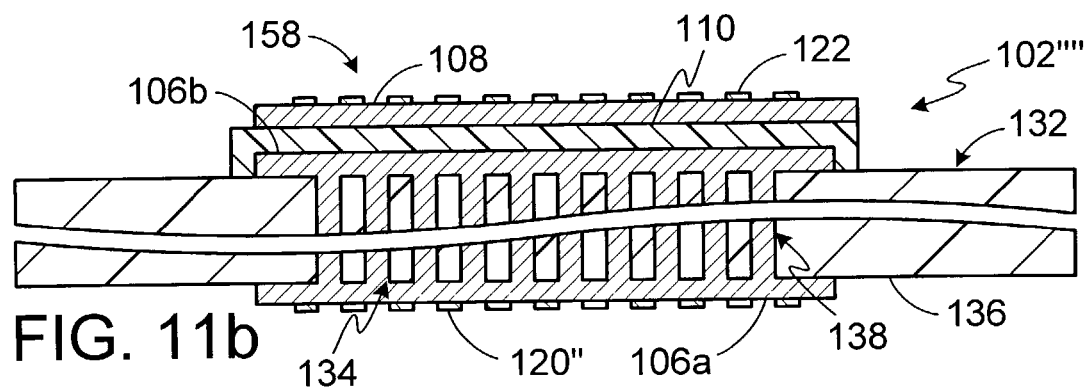
FIG. 11*b* is a section view taken along line 11*b*—11*b* in FIG. 11*a*.

Yet another exemplary fuel cell assembly, which consists of a fuel cell 102'''' and a substrate 132, is generally represented by reference numeral 158 in FIGS. 11a and 11b. The fuel cell assembly 158 illustrated in FIGS. 11a and 11b is substantially identical to the fuel cell assembly 154 illustrated in FIG. 7 and similar elements are represented by similar reference numerals. Detailed descriptions of many of the substantially identical aspects of the fuel cell 102'''' have been omitted for the sake of brevity, and the prior descriptions of these aspects with respect to the exemplary fuel cells 102, 102', 102" and 102''' are incorporated herein by reference. Here, however, portions of the electrode closest to the substrate 132 cover both surfaces of the reactant permeable region 134 of the substrate in addition to extending through the reactant permeable region. Such an arrangement eliminates the need to use sacrificial material during the manufacturing process and facilitates current collection on both sides of the substrate. Additionally, although the respective positions of the anode 106''' and cathode 108 may be reversed, the closest electrode to the substrate in the exemplary fuel cell 102'''' is the anode.

The fuel cell assembly 158 may, for example, be incorporated into the fuel cell system 100 and stack 104 described above with reference to FIGS. 1 and 3, albeit in a bipolar stack arrangement.

Figure 12A:
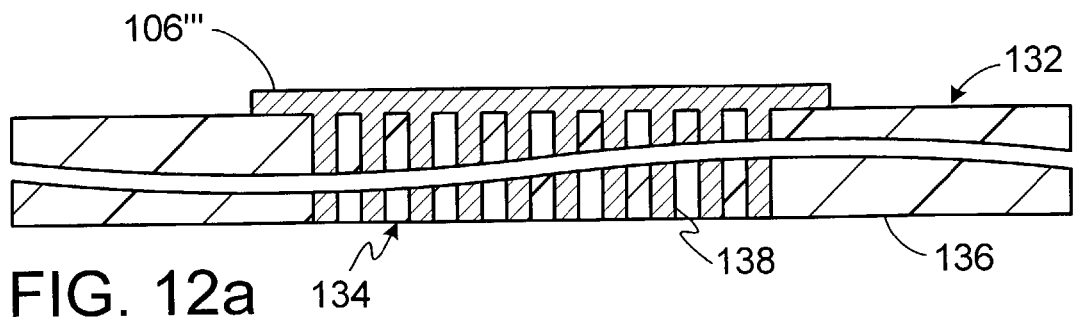
FIGS. 12*a*–12*e* are section views illustrating steps in a fuel cell assembly manufacturing process in accordance with a preferred embodiment of a present invention.
Figure 12B:
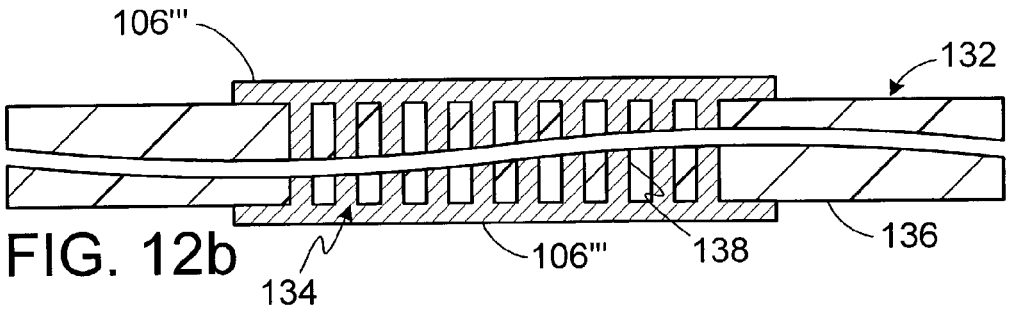
Figure 12C:
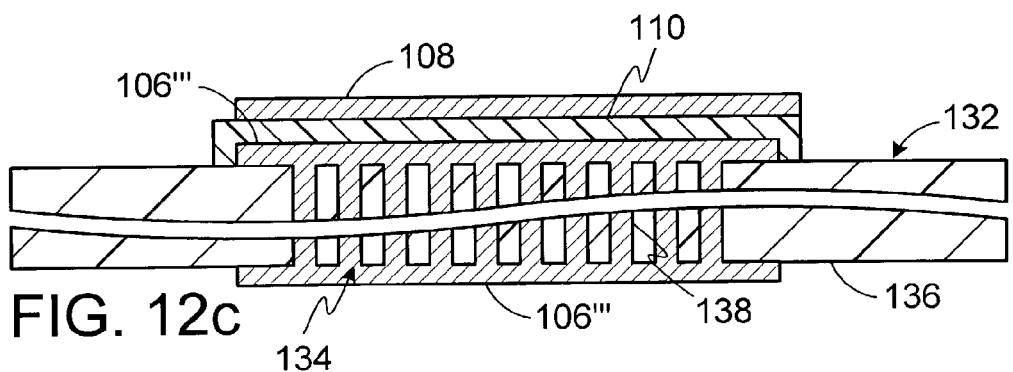

An exemplary method of manufacturing the exemplary fuel cell assembly 158 is illustrated in FIGS. 12a–12e. This method is substantially identical to the methods described above with reference to FIGS. 4a–4o, 6a–6h and 8a–8h. For example, the substrate 132 illustrated in FIG. 12a is formed in the manner described above with reference to FIGS. 4a and 4b and, as described above with reference to FIGS. 8a–8h, no sacrificial material is used. Accordingly, detailed descriptions of many of the substantially identical aspects of the method have been omitted for the sake of brevity, and the prior descriptions of these aspects are incorporated herein by reference. After the substrate 132 is formed, the next step in the process is the formation of the first portions of the anode 106''' on the surface of the substrate over the reactant permeable region 134 as well as within the apertures 138 (FIG. 12a). This may be accomplished in the manner described above with reference to FIGS. 8d and 8e. Next, as illustrated in FIG. 12b, the remainder of the anode 106''' is formed over the reactant permeable region 134 on the other side of the substrate 132. After the anode 106''' has been formed, the next steps in the exemplary process are the formation of the electrolyte 110 and the cathode 108 (FIG. 12c) in the manner described above with reference to FIGS. 8f and 8g.

Figure 12D:
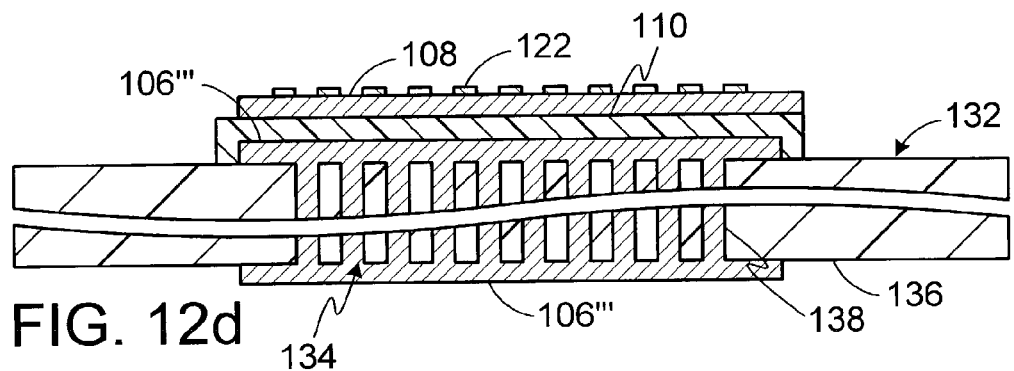
Figure 12E:
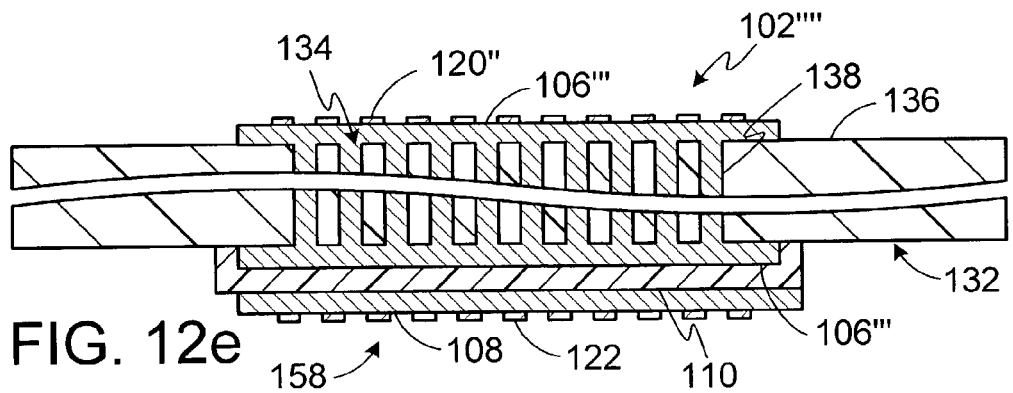

Turning to FIGS. 12d and 12e, the formation of the current collectors 122 and 120" may be accomplished in the manner described above with reference to FIGS. 4n and 4o. This completes the formation of the exemplary fuel cell 102"" and fuel cell assembly 158.

Although the present inventions have been described in terms of the preferred embodiments above, numerous modifications and/or additions to the above-described preferred embodiments would be readily apparent to one skilled in the art. It is intended that the scope of the present inventions extend to all such modifications and/or additions.

We claim:

1. A fuel cell assembly, comprising:
   a substrate including a reactant-permeable region with a plurality of apertures and a non-permeable support region; and
   a fuel cell, including first and second electrodes, carried by the substrate such that at least a portion of the fuel cell is positioned over the reactant permeable region and portions of the first electrode are located within the apertures.

2. A fuel cell assembly as claimed in claim 1, wherein the substrate defines a thickness, the fuel cell defines a thickness, and the substrate is substantially thicker than the fuel cell.

3. A fuel cell assembly as claimed in claim 2, wherein the substrate is at least 5 times as thick as the portion of the fuel cell positioned over the reactant permeable region.

4. A fuel cell assembly as claimed in claim 1, wherein the non-permeable support region surrounds the reactant permeable region.

5. A fuel cell assembly as claimed in claim 1, wherein the substrate is a unitary structure.

6. A fuel cell assembly as claimed in claim 1, wherein the first electrode is in contact with reactant permeable region.

7. A fuel cell assembly as claimed in claim 1, wherein
   the first and second electrodes comprise first and second electrode films,
   an electrolyte film is positioned over at least a portion of the first electrode film, and
   the second electrode film is positioned over at least a portion of the electrolyte film.

8. A fuel cell assembly, comprising:
   a substrate including a reactant-permeable region, with a plurality of apertures and defining a top surface and a bottom surface, and a non-permeable support region; and
   a fuel cell, including first and second electrodes, carried by the substrate such that at least a portion of the fuel cell is positioned over the reactant permeable region, and the first electrode covers a portion of the top surface of the reactant permeable region, is located within at least some of the apertures, and covers a portion of the bottom surface of the reactant permeable region.

9. A fuel cell assembly as claimed in claim 8, wherein the substrate defines a thickness, the fuel cell defines a thickness, and the substrate is substantially thicker than the fuel cell.

10. A fuel cell assembly as claimed in claim 9, wherein the substrate is at least 5 times as thick as the portion of the fuel cell positioned over the reactant permeable region.

11. A fuel cell assembly as claimed in claim 8, wherein the non-permeable support region surrounds the reactant permeable region.

12. A fuel cell assembly as claimed in claim 8, wherein the substrate is a unitary structure.

13. A fuel cell assembly as claimed in claim 8, wherein
    the first and second electrodes comprise first and second electrode films,
    an electrolyte film is positioned over at least a portion of the first electrode film, and
    the second electrode film is positioned over at least a portion of the electrolyte film.

14. A fuel cell system, comprising:
    a fuel cell stack including a plurality of fuel cell assemblies arranged in spaced relation to one another;
    each fuel cell assembly including a substrate, having a reactant-permeable region with a plurality of apertures and a non-permeable support region, and a fuel cell, including first and second electrodes, carried by the substrate such that at least a portion of the fuel cell is over the reactant permeable region and portions of the first electrode are located within the apertures;
    a fuel source operably connected to the stack; and
    an oxidant source operably connected to the stack.

15. A fuel cell system as claimed in claim 14, the fuel cell assemblies are arranged such that at least two of the substrates face one another and define a reactant passage therebetween.

16. A fuel cell system as claimed in claim 14, wherein the substrates define a thickness, the fuel cells define a thickness, and the substrates are substantially thicker than the fuel cells.

17. A fuel cell system as claimed in claim 16, wherein the substrates are at least 5 times as thick as the fuel cells.

18. A fuel cell system as claimed in claim 14, wherein the non-permeable support region of each substrate surrounds the reactant permeable region.

19. A fuel cell system as claimed in claim 14, wherein the substrates are unitary structures.

20. A fuel cell system as claimed in claim 14, wherein the first electrode of each fuel cell is in contact with reactant permeable region of the associated substrate.

21. A fuel cell system as claimed in claim 14, wherein
    the first and second electrodes of each fuel cell comprise first and second electrode films,
    an electrolyte film is positioned over at least a portion of the first electrode film in each fuel cell, and
    the second electrode film is positioned over at least a portion of the electrolyte film in each fuel cell.

22. A fuel cell system, comprising:
    a fuel cell stack including a plurality of fuel cell assemblies arranged in spaced relation to one another;
    each fuel cell assembly including a substrate, having a reactant-permeable region with a plurality of apertures and defining a top surface and a bottom surface, and a non-permeable support region, and a fuel cell including first and second electrodes, carried by the substrate such that at least a portion of the fuel cell is over the reactant-permeable region and the first electrode covers a portion of the top surface of the reactant permeable region, is located within at least some of the apertures, and covers a portion of the bottom surface of the reactant permeable regions;
    a fuel source operably connected to the stack; and
    an oxidant source operably connected to the stack.

23. A fuel cell system as claimed in claim 22, the fuel cell assemblies are arranged such that at least two of the substrates face one another and define a reactant passage therebetween.

24. A fuel cell system as claimed in claim 22, wherein the substrates define a thickness, the fuel cells define a thickness, and the substrates are substantially thicker than the fuel cells.

25. A fuel cell system as claimed in claim 24, wherein the substrates are at least 5 times as thick as the fuel cells.

26. A fuel cell system as claimed in claim 22, wherein the non-permeable support region of each substrate surrounds the reactant permeable region.

27. A fuel cell system as claimed in claim 22, wherein the substrates are unitary structures.

28. A fuel cell system as claimed in claim 22, wherein
    the first and second electrodes of each fuel cell comprise first and second electrode films,
    an electrolyte film is positioned over at least a portion of the first electrode film in each fuel cell, and
    the second electrode film is positioned over at least a portion of the electrolyte film in each fuel cell.

29. A fuel cell assembly produced by a process comprising the step of:
    providing a substrate having a reactant permeable region, defining a top surface and a bottom surface, and a non-permeable support region; and
    forming a fuel cell, on the substrate over the reactant permeable region, that includes a first electrode that covers a portion of the top surface of the reactant permeable region, extends through the substrate, and covers a portion of the bottom surface of the reactant permeable region.

30. A fuel cell assembly as claimed in claim 29, wherein the step of providing a substrate comprises the steps of:
    providing a sheet of substrate material; and
    removing portions of the substrate material from the sheet to form a plurality of apertures that define the reactant-permeable region.

31. A fuel cell assembly as claimed in claim 30, wherein the step of removing portions of the substrate material from the sheet comprises punching apertures into the sheet of substrate material.

32. A fuel cell assembly as claimed in claim 29, wherein the step of providing a substrate comprises molding a substrate with a plurality of apertures in the reactant permeable region.

33. A fuel cell assembly as claimed in claim 29, wherein the step of forming a fuel cell on the substrate comprises the steps of:
    forming a first electrode film over the top and bottom surfaces and within the apertures of the reactant-permeable region;
    forming an electrolyte film over at least a portion of the first electrode film; and
    forming a second electrode film over at least a portion of the electrolyte film.

* * * * *